United States Patent
Eichelsdoerfer et al.

(10) Patent No.: US 11,352,579 B2
(45) Date of Patent: *Jun. 7, 2022

(54) GROUP III BASE STOCKS AND LUBRICANT COMPOSITIONS

(71) Applicant: ExxonMobil Technology and Engineering Company, Annandale, NJ (US)

(72) Inventors: Daniel J. Eichelsdoerfer, Philadelphia, PA (US); Richard C. Dougherty, Moorestown, NJ (US); Charles L. Baker, Jr., Thornton, PA (US); Rugved P. Pathare, Pittstown, NJ (US); Bryan E. Hagee, Hamilton, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/221,742

(22) Filed: Dec. 17, 2018

(65) Prior Publication Data

US 2019/0194562 A1 Jun. 27, 2019

Related U.S. Application Data

(60) Provisional application No. 62/608,766, filed on Dec. 21, 2017.

(51) Int. Cl.
*C10M 101/02* (2006.01)
*C10G 47/16* (2006.01)
(Continued)

(52) U.S. Cl.
CPC ........ *C10M 101/02* (2013.01); *B01J 29/7892* (2013.01); *B01J 35/1004* (2013.01);
(Continued)

(58) Field of Classification Search
None
See application file for complete search history.

(56) References Cited

U.S. PATENT DOCUMENTS

| 4,584,747 A | 4/1986 | Katterbach et al. |
| 5,075,269 A | 12/1991 | Degnan et al. |

(Continued)

FOREIGN PATENT DOCUMENTS

| EP | 2881452 A1 | 6/2015 |
| WO | 2004007646 A1 | 1/2004 |

(Continued)

OTHER PUBLICATIONS

Kramer, D.C., et al. "Influence of Group II & III Base Oil Composition on VI and Oxidation Stability" 66th Annual NLGI Meeting, Oct. 24-27, 1999.

(Continued)

*Primary Examiner* — Tam M Nguyen
(74) *Attorney, Agent, or Firm* — Scott F. Yarnell

(57) ABSTRACT

Disclosed are Group III base stocks comprising at least 30 wt % naphthenes, a viscosity index from 120 to 145; and a unique ratio of molecules with multi-ring naphthenes to single ring naphthenes (2R+N/1RN). A method for preparing the base stocks is also disclosed. Also disclosed is a lubricating oil having the base stock as a major component, and an additive as a minor component.

28 Claims, 4 Drawing Sheets

(51) Int. Cl.

| | | |
|---|---|---|
| *C10G 45/64* | (2006.01) | |
| *C10G 45/62* | (2006.01) | |
| *C10G 73/06* | (2006.01) | |
| *C10G 7/06* | (2006.01) | |
| *B01J 35/10* | (2006.01) | |
| *B01J 29/78* | (2006.01) | |
| *C10G 45/08* | (2006.01) | |
| *C10G 47/18* | (2006.01) | |
| *C10G 45/00* | (2006.01) | |
| *C10G 65/12* | (2006.01) | |
| *C10G 47/12* | (2006.01) | |
| *C10N 20/02* | (2006.01) | |
| *C10N 20/00* | (2006.01) | |
| *C10N 30/10* | (2006.01) | |
| *C10N 40/25* | (2006.01) | |

(52) U.S. Cl.
CPC .............. *C10G 7/06* (2013.01); *C10G 45/00* (2013.01); *C10G 45/08* (2013.01); *C10G 45/62* (2013.01); *C10G 45/64* (2013.01); *C10G 47/12* (2013.01); *C10G 47/16* (2013.01); *C10G 47/18* (2013.01); *C10G 65/12* (2013.01); *C10G 73/06* (2013.01); *C10G 2300/1074* (2013.01); *C10G 2400/02* (2013.01); *C10G 2400/04* (2013.01); *C10G 2400/06* (2013.01); *C10G 2400/08* (2013.01); *C10G 2400/10* (2013.01); *C10M 2203/1025* (2013.01); *C10M 2203/1065* (2013.01); *C10N 2020/02* (2013.01); *C10N 2020/065* (2020.05); *C10N 2020/067* (2020.05); *C10N 2030/10* (2013.01); *C10N 2040/252* (2020.05)

(56) References Cited

U.S. PATENT DOCUMENTS

| | | | |
|---|---|---|---|
| 6,156,695 | A | 12/2000 | Soled et al. |
| 6,299,760 | B1 | 10/2001 | Soled et al. |
| 6,582,590 | B1 | 6/2003 | Riley et al. |
| 6,712,955 | B1 | 3/2004 | Hou et al. |
| 6,783,663 | B1 | 8/2004 | Riley et al. |
| 6,863,803 | B1 | 3/2005 | Riley et al. |
| 6,929,738 | B1 | 8/2005 | Riley et al. |
| 7,229,548 | B2 | 6/2007 | Riley et al. |
| 7,288,182 | B1 | 10/2007 | Soled et al. |
| 7,410,924 | B2 | 8/2008 | Canos et al. |
| 7,482,300 | B2 | 1/2009 | Lai et al. |
| 7,544,632 | B2 | 6/2009 | Soled et al. |
| 7,625,478 | B2 | 12/2009 | Lai et al. |
| 7,682,502 | B2 | 3/2010 | McCarthy et al. |
| 7,686,949 | B2 | 3/2010 | McCarthy et al. |
| 7,704,930 | B2 | 4/2010 | Deckman et al. |
| 7,838,709 | B2 | 11/2010 | Matsui et al. |
| 8,294,255 | B2 | 10/2012 | Kim |
| 8,394,745 | B2 | 3/2013 | Sano et al. |
| 8,425,762 | B2 | 4/2013 | McCarthy et al. |
| 8,992,764 | B2 | 3/2015 | Prentice et al. |
| 9,206,370 | B2 | 12/2015 | Wang et al. |
| 2005/0277545 | A1 | 12/2005 | Shih et al. |
| 2006/0060502 | A1 | 3/2006 | Soled et al. |
| 2006/0289337 | A1 | 12/2006 | Rosenbaum et al. |
| 2007/0084754 | A1 | 4/2007 | Soled et al. |
| 2007/0131579 | A1 | 6/2007 | Koivusalmi et al. |
| 2007/0142250 | A1 | 6/2007 | Loh et al. |
| 2008/0132407 | A1 | 6/2008 | Bai et al. |
| 2009/0163391 | A1 | 6/2009 | Zakarian et al. |
| 2013/0264246 | A1 | 10/2013 | Holtzer et al. |
| 2017/0283729 | A1 | 10/2017 | Pathare et al. |
| 2018/0105761 | A1 | 4/2018 | Calla et al. |

FOREIGN PATENT DOCUMENTS

| | | |
|---|---|---|
| WO | 2007084437 A2 | 7/2007 |
| WO | 2007084438 A2 | 7/2007 |
| WO | 2007084439 A2 | 7/2007 |
| WO | 2007084471 A1 | 7/2007 |
| WO | 2018234188 A1 | 12/2018 |

OTHER PUBLICATIONS

International Search Report and Written Opinion for PCT/US2018/065942, dated Mar. 25, 2019.

International Search Report and Written Opinion for PCT/US2018/065949, dated Mar. 29, 2019.

International Search Report and Written Opinion for PCT/US2018/065944, dated Apr. 5, 2019.

GROUP III BASE STOCKS AND LUBRICANT COMPOSITIONS

CROSS-REFERENCE TO RELATED APPLICATIONS

This application claims the benefit of U.S. Provisional Application No. 62/608,766, filed on Dec. 21, 2017, the entire contents of which are incorporated herein by reference.

In addition, this application claims the benefit of related U.S. Provisional Application Nos. 62/608,745, 62/608,757, and 62/608,779, all filed on Dec. 21, 2017, the entire contents of each are also incorporated herein by reference.

FIELD

This disclosure relates to Group III base stocks, blends of base stocks and formulated lubricant compositions containing the Group III base stocks and blends. This disclosure further relates to a process for producing a diesel fuel and the Group III base stocks from feed stocks having a solvent dewaxed oil feed viscosity index of from about 45 to about 150.

BACKGROUND

Base oil is the major constituent in finished lubricants and contributes significantly to their properties. For example, engine oils are finished crankcase lubricants intended for use in automobile engines and diesel engines and contain two general components, namely, a base stock or base oil (one base stock or a blend of base stocks) and additives. In general, a few lubricating base oils are used to manufacture a variety of engine oils by varying the mixtures of individual lubricating base oils and individual additives.

According to the American Petroleum Institute (API) classifications, base stocks are categorized in five groups based on their saturated hydrocarbon content, sulfur level, and viscosity index (Table 1). Lube base stocks are typically produced in large scale from non-renewable petroleum sources. Group I, II, and III base stocks are all derived from crude oil via extensive processing, such as solvent extraction, solvent or catalytic dewaxing, and hydroisomerization. Group III base stocks can also be produced from synthetic hydrocarbon liquids obtained from natural gas, coal or other fossil resources, Group IV base stocks are polyalphaolefins (PAOs), and are produced by oligomerization of alpha olefins, such as 1-decene. Group V base stocks include all base stocks that do not belong to Groups I-IV, such as naphthenics, polyalkylene glycols (PAG), and esters.

TABLE 1

| API classification | Group I | Group II | Group III | Group IV | Group V |
|---|---|---|---|---|---|
| % Saturates | <90 | ≥90 | ≥90 | Polyalpha-olefins (PAOs) | All others not belonging to group I-IV |
| % S | >0.03 | ≤0.03 | ≤0.03 | | |
| Viscosity Index (VI) | 80-120 | 80-120 | 120 | | |

Base oils are generally produced from the higher boiling fractions recovered from a vacuum distillation operation. They may be prepared from either petroleum-derived or from syncrude-derived feed stocks or from synthesis of lower molecular weight molecules. Additives are chemicals which are added to base oil to improve certain properties in the finished lubricant so that it meets the minimum performance standards for the grade of the finished lubricant. For example, additives added to the engine oils may be used to improve oxidation stability of the lubricant, increase its viscosity, raise the viscosity index, and control deposits. Additives are expensive and may cause miscibility problems the finished lubricant. For these reasons, it is generally desirable to optimize the additive content of the engine oils to the minimum amount necessary to meet the appropriate requirements.

Formulations are undergoing changes driven by a need for increased quality. For example governing organizations (e.g., the American Petroleum Institute) help to define the specifications for engine oils. Increasingly, the specifications for engine oils are calling for products with excellent low temperature properties and high oxidation stability. Currently, only a small fraction of the base oils blended into engine oils are able to meet the most stringent of the demanding engine oil specifications. Currently, formulators are using a range of base stocks including Group I, II, III, IV, and V base stocks to formulate their products.

Industrial oils are also being pressed for improved quality in oxidation stability, cleanliness, interfacial properties and deposit control. Despite advances in lubricating base oils and lubricant oil formulation technology, there exists a need for improving oxidation performance (for example, for engine oils and industrial oils that have a longer life) and low temperature performance of formulated oils. In particular, there exists a need for improving oxidation performance and low temperature performance of formulated oils without the addition of more additives to the lubricant oil formulation.

SUMMARY

This disclosure relates to Group III base stocks and to formulated lubricant compositions containing the Group III base stocks and blends. This disclosure further relates to a process for producing a diesel fuel and the base stocks from feed stocks having a solvent dewaxed oil feed viscosity index of from about 45 to about 150.

This disclosure relates in part to Group III base stocks having a kinematic viscosity at 100° C. of at least 2 cSt, such as from 2 cSt to above 14 cSt, for example from 2 cSt to 12 cSt and from 4 cSt to 7 cSt, according to various embodiments of the present invention. These base stocks are also referred to as lubricating oil base stocks or products in the present disclosure.

In an embodiment, the present disclosure provides an API Group III base stock comprising: at least 30 wt % naphthenes; a viscosity index of from 120 up to 133; and a ratio of molecules with multi-ring naphthenes to single ring naphthenes, 2R+N/1RN, of less than about 0.46.

In another embodiment, the present disclosure provides an API Group III base stock comprising: at least 30 wt % naphthenes; a viscosity index of 120 to 145 that is less than or equal to $142*(1-0.0025\ exp(8*(2R+N/1RN)))$.

In another embodiment, the present disclosure provides an API Group III base stock comprising: at least 30 wt % naphthenes; a viscosity index of 120 to 145 that is less than or equal to $150.07*(1-0.0106*exp(4.5*(2R+N/1RN)))$.

In another embodiment, the present disclosure provides a method for producing a diesel fuel and a base stock, comprising: providing a feed stock comprising a vacuum gas oil; hydrotreating the feed stock under first effective hydrotreating conditions to produce a first hydrotreated effluent; hydrotreating the first hydrotreated effluent under second effective hydrotreating conditions to produce a second hydrotreated effluent; fractionating the second hydrotreated effluent to produce at least a first diesel product fraction and a bottoms fraction; hydrocracking the bottoms fraction under effective hydrocracking conditions to produce a hydrocracked effluent; dewaxing the hydrocracked effluent under effective catalytic dewaxing conditions to produce a dewaxed effluent, the dewaxing catalyst including at least one non-dealuminated, unidimensional, 10-member ring pore zeolite, and at least one Group 6 metal, Group 8 metal or combination thereof; hydrotreating the dewaxed effluent under third effective hydrotreating conditions to produce a third hydrotreated effluent; and fractionating the third hydrotreated effluent to form at least a second diesel product fraction and a base stock product fraction having a kinematic viscosity at 100° C. greater than 2 cSt and a ratio of multi-ring naphthenes to single ring naphthenes (2R+N/1RN) of less than 0.46.

This disclosure also relates in part to a lubricating composition comprising one or more of the Group III base stocks as a major component and a lubricant additive as a minor component. In an embodiment, the lubricating compositions comprising a base stock of the present disclosure have improved oxidation stability as compared to the oxidation stability of conventional lubricating oils containing a base stock. In a further embodiment, the lubricating compositions have improved low temperature performance as compared to low temperature performance of conventional lubricating oils containing a base stock.

This disclosure also relates to a process for producing a diesel fuel and a Group III base stock. Generally, a feed stock (e.g., a heavy vacuum gas oil feed stock having a solvent dewaxed oil feed viscosity index of from about 45 to about 150) or a mixed feed stock having a solvent dewaxed oil feed viscosity index of from about 45 to about 150 is processed through a first stage which is primarily a hydrotreating unit which boosts viscosity index (VI) and removes sulfur and nitrogen. This is followed by a stripping section where light ends and diesel are removed. The heavier lube fraction then enters a second stage where hydrocracking, dewaxing, and hydrofinishing are performed. This combination of feed stock and process approaches produces a base stock with unique compositional characteristics. These unique compositional characteristics are observed in both the low, medium and high viscosity base stocks produced. The fractions produced by such a method include a Grp III base stock product fraction which comprises greater than or equal to 90 wt. % saturated hydrocarbons, a kinematic viscosity at 100° C. greater than 2 cSt and a ratio of multi-ring naphthenes to single ring naphthenes (2R+N/1RN) of less than about 0.46.

Other objects and advantages of the present disclosure will become apparent from the detailed description that follows.

DETAILED DESCRIPTION

Figure 1:
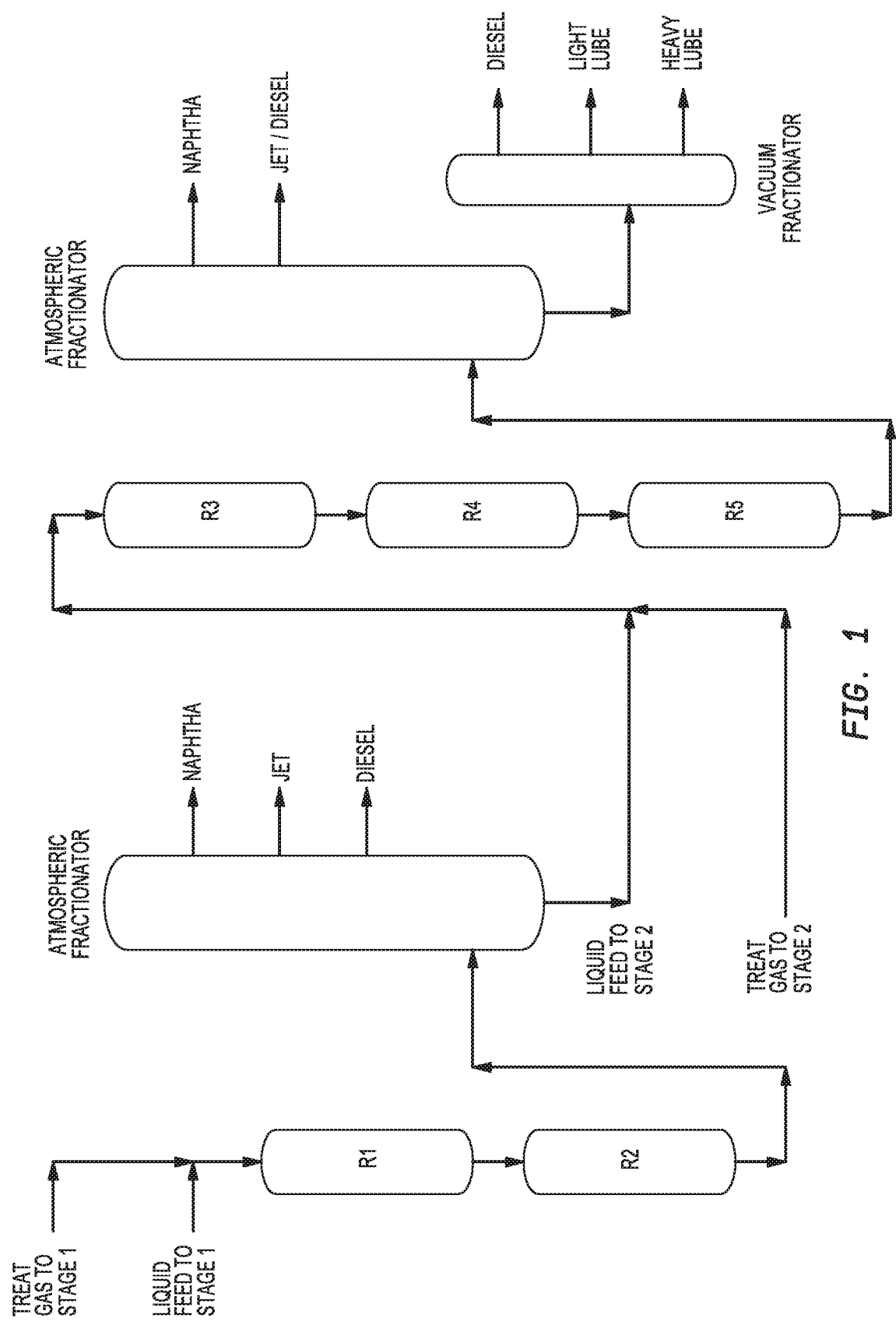
FIG. 1 is a multi-stage reaction system according to an embodiment of the disclosure.

All numerical values within the detailed description and the claims herein are modified by "about" or "approximately" the indicated value, and take into account experimental error and variations that would be known to a person of ordinary skill in the art.

As used herein, the term "major component" means a component (e.g., base stock) present in a lubricating oil of this disclosure in an amount greater than about 50 weight percent (wt. %).

As used herein, the term "minor component" means a component (e.g., one or more lubricating oil additives) present in a lubricating oil of this disclosure in an amount less than 50 weight percent.

As used herein, the term "single ring naphthenes" means a saturated hydrocarbon group having the general formula $C_nH_{2n}$ arranged in the form of a single closed ring, where n is the number of carbon atoms. It is also denoted herein as 1RN.

As used herein, the term "multi-ring naphthenes" means a saturated hydrocarbon group having the general formula $C_nH_{2(n+1-r)}$ arranged in the form of multiple closed rings, where n is the number of carbon atoms and r is the number of rings (here, r>1). It is also denoted herein as 2+RN.

As used herein, "kinematic viscosity at 100° C." will be used interchangeably with "KV100" and "kinematic viscosity at 40° C." will be used interchangeably with "KV40." The two terms should be considered equivalent.

Lubricating Oil Base Stocks

In accordance with this disclosure, base stock compositions or lubricating oil base stocks are provided having relative amounts of certain species different than known previously for commercial base stocks. The present inventors have surprisingly discovered base stocks having a ratio of 2R+N/1RN, such as those produced, for example, by the method described herein, that is lower than would be expected from existing commercial base stocks using lower VI feedstocks (~45-100) that are representative of typical raffinates or vacuum gas oils (VGOs). Lower levels of 2R+N are desirable in base oils because it is generally understood that high levels of 2R+N are harmful to the oxidation performance of formulated oils. It has also surprisingly been found that the process used herein can co-produce Group III base stocks of high viscosity (~8-12 cSt) with lower levels of 2R+N from paraffinic feeds; generally, when high viscosity base stocks are co-produced with lower viscosity base stocks, the paraffins concentrate in the lower viscosity fractions. Surprisingly, the process described herein can co-produce Group III light neutral (LN), medium neutral (MN), and heavy neutral (HN) base stocks from paraffinic feedstocks.

According to various embodiments of the disclosure, the base stocks are API Group III base stocks.

Group III base stocks of the present disclosure can be produced by an advanced hydrocracking process using a feed stock, for example, a vacuum gas oil feed stock having a solvent dewaxed oil feed viscosity index of at least 45, such as at least 55, for example at least 60 up to 150, or 60 to 90, or a heavy vacuum gas oil and heavy atmospheric gas oil mixed feed stock having a solvent dewaxed oil feed viscosity index of at least 45, such as at least 55, for example, at least 60 to about 150, or 60 to 90. Group III at least 45, such as at least 55, for example at least 60 up to 150, or 60 to 90. Group III base stocks of the present disclosure can have a kinematic viscosity at 100° C. greater than 2 cSt, such as from 2 cSt to 14 cSt, for example from 2 cSt to 12 cSt and from 4 cSt to 12 cSt. Group III base stocks of the present disclosure can have a naphthene content of 30 wt. % to 70 wt. %, as a percentage of the total base stock, and a ratio of multi-ring naphthenes to single ring naphthenes (2R+N/1RN) less than about 0.46.

The API Group III base stocks of the present disclosure having a multi-ring naphthenes to single ring naphthenes ratio of less than 0.46 for base stocks having a kinematic viscosity at 100° C. of 4-5 cSt can also have a viscosity index (VI) of from 120 to 143 and is less than or equal to $142*(1-0.0025 \exp(8*(2R+N/1RN)))$. Similarly, for base stocks with a kinematic viscosity at 100° C. of 5-12 cSt, the ratio of multi-ring naphthenes to single ring naphthenes ratio can be less than 0.46 and the viscosity index can be from 120 to 133 and is less than or equal to $150.07*(1-0.0106*\exp(4.5*(2R+N/1RN)))$. In an embodiment, the API Group III base stocks have less than 10 wt. % unsaturated hydrocarbons and a viscosity index of from 120 up to 145 that is less than or equal to $142*(1-0.0025 \exp(8*(2R+N/1RN)))$. In another embodiment, the Group III base stocks have less than 10 wt. % unsaturated hydrocarbons and a viscosity index of from 120 up to 145 that is less than or equal to $150.07*(1-0.0106*\exp(4.5*(2R+N/1RN)))$.

Additionally, the absolute value of naphthenes can be lower in the base stocks of the present disclosure as compared to commercially known base stocks across the range of viscosities.

According to various embodiments of the present invention, the Group III base stocks of the present disclosure can have less than 0.03 wt. % sulfur, a pour point of −10° C. to −30° C., a Noack volatility of 0.5 wt. % to 20 wt. %, a CCS (cold crank simulator) value at −35° C. of 100 cP up to 70,000 cP, and naphthene content of 30 wt. % to 70 wt. %. The light neutral Group III base stocks, i.e., those with a KV100 of 2 cSt to 5 cSt, can have a Noack volatility of from 8 wt. % to 20 wt. %, a CCS value at −35° C. of 100 cP to 6,000 cP, a pour point of −10° C. to −30° C. and naphthene content of 30 wt. % to 60 wt. %. The medium neutral Group III base stocks of the present disclosure, i.e., those with KV100 of 5 cSt to 7 cSt, can have a Noack volatility of 2 wt. % to 10 wt. %, a CCS value at −35° C. of 3,500 cP to 20,000 cP, a pour point of −10° C. to −30° C. and naphthene content of 30 wt. % to 60 wt. %. The heavy neutral Group III base stocks of the present disclosure, i.e. those with KV100 of 7 cSt to 12 cSt, can have a Noack volatility of 0.5 wt. % to 4 wt. %, a CCS value at −35° C. of 10,000 cP to 70,000 cP, a pour point of −10° C. to −30° C. and naphthene content of 30 wt. % to 70 wt. %. According to various embodiments of the present invention, the Group III base stocks comprise 30 wt. % to 70% paraffins, or 31 wt. % to 69 wt. % paraffins or 32 wt. % to 68 wt. % paraffins. According to various embodiments of the present invention, a light neutral Group III base stock can contain 40 wt. % to 70 wt. %, or 45 wt. % to 70 wt. %, or 45 wt % to 65 wt. % of paraffins. According to various embodiments of the present invention, a medium neutral Group III base stock can contain 35 wt. % to 65 wt. %, or 40 wt. % to 65 wt. %, or 40 wt % to 60 wt. % of paraffins. According to various embodiments of the present invention, a heavy neutral Group III base stock can contain 30 wt. % to 60 wt. %, or 30 wt. % to 55 wt. %, or 30 wt % to 50 wt. %, or 30 wt. % to 45 wt. %, or 30 wt. % to 40 wt. % of paraffins.

Process

The process described below can be used to produce the compositionally advantaged Group III base stocks of this disclosure. Generally, a feed stock, for example, a heavy vacuum gas oil feed stock having a solvent dewaxed oil feed viscosity index of from at least 45, preferably at least 55, and more preferably at least 60 up to about 150, or a mixed feed stock having a solvent dewaxed oil feed viscosity index of from at least 45, preferably at least 55, and more preferably at least 60 up to about 150 is processed through a first stage which is primarily a hydrotreating unit which boosts viscosity index (VI) and removes sulfur and nitrogen. This is followed by a stripping section where light ends and diesel are removed. The heavier lube fraction then enters a second stage where hydrocracking, dewaxing, and hydrofinishing are performed. This combination of feed stock and process approaches produces a base stock with unique compositional characteristics. These unique compositional characteristics are observed in both the low, medium and high viscosity base stocks produced.

The process configurations of the present disclosure produce high quality Group III base stocks that have unique compositional characteristics with respect to conventional Group III base stocks. The compositional advantage may be derived from the multi-ring naphthenes to single ring naphthenes ratio of the composition.

The processes of the present disclosure can produce base stocks having a kinematic viscosity at 100° C. (KV100) of greater than or equal to 2 cSt, or greater than or equal to 4 cSt, such as from 4 cSt to 7 cSt, or greater than or equal to 6 cSt, or greater than or equal to 8 cSt, or greater than or equal to 10 cSt, or greater than or equal to 12 cSt, or greater than or equal to 14 cSt. The base stocks produced using the processes of the present disclosure can yield base stocks having a VI of at least 120 up to about 145, such as 120 to 140 or 120 to 133.

As used herein, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst or dewaxing catalyst. It is noted that a "bed" of catalyst can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

Configuration Example

Figure 2:
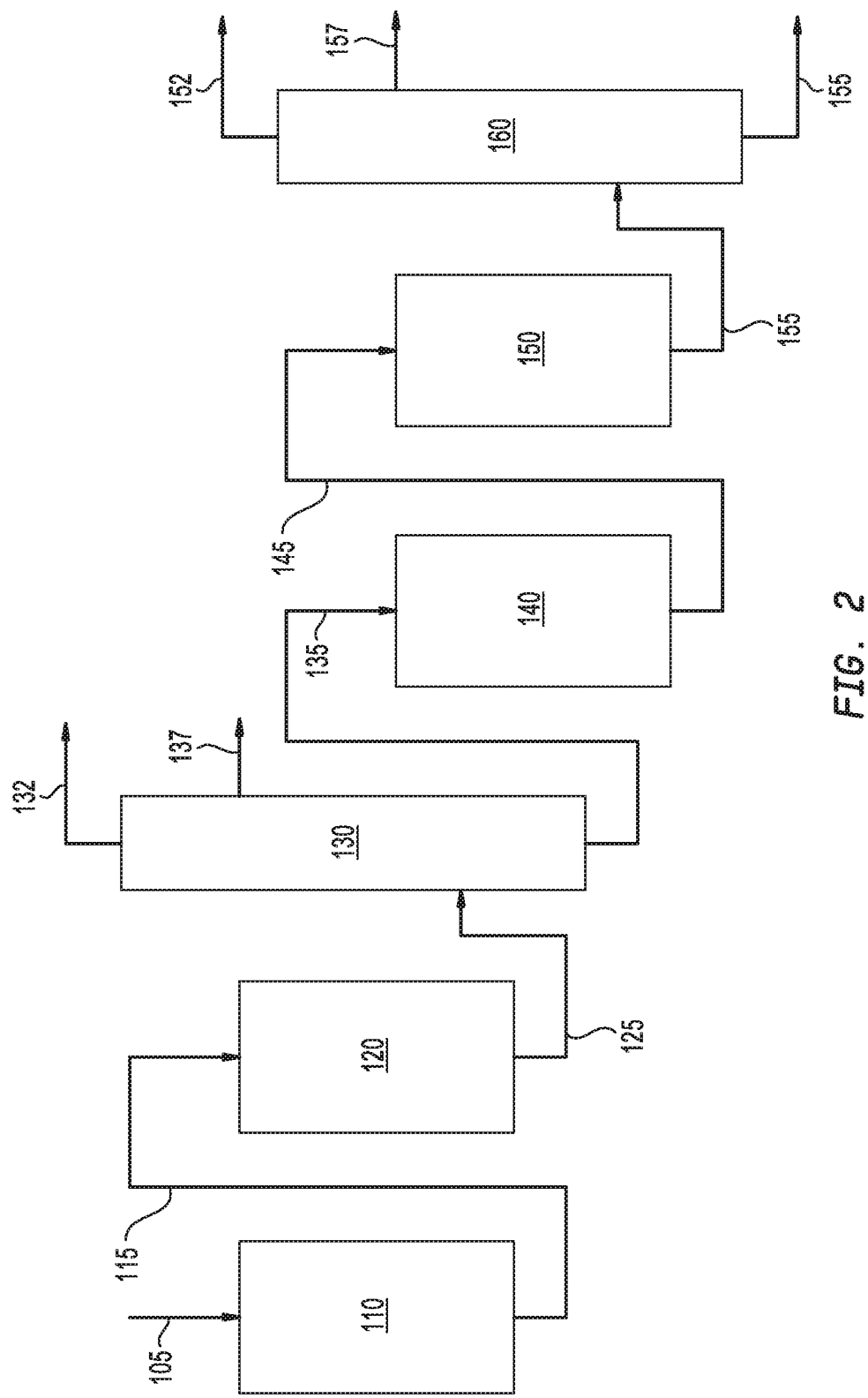
FIG. 2 shows an example of a processing configuration suitable for producing Group III base stocks of the present disclosure.
Figure 3:
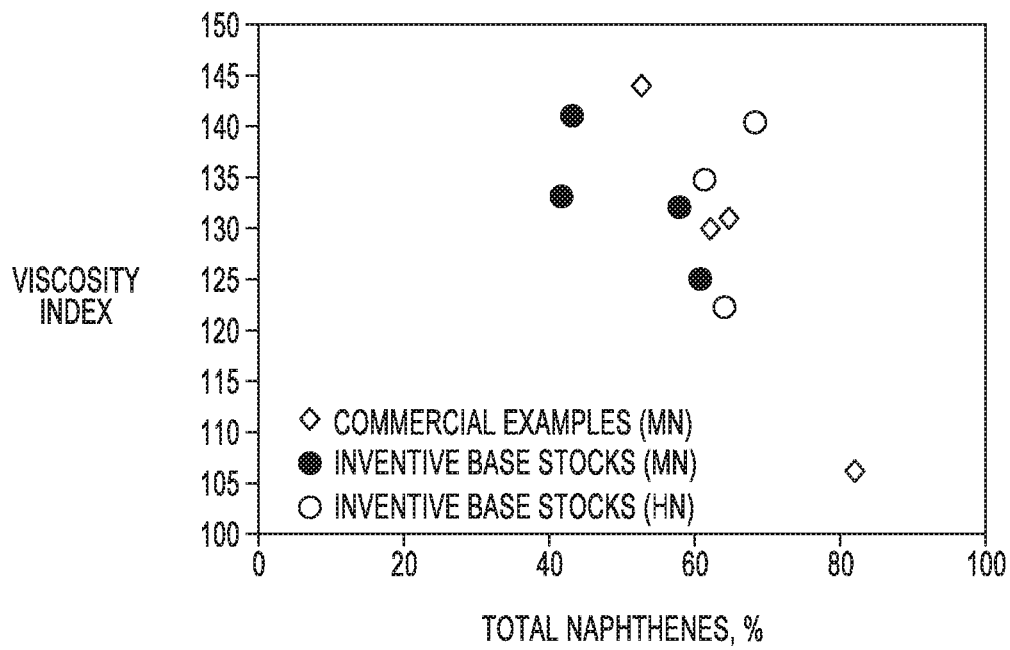
FIG. 3 is a graph illustrating the relationship between total naphthene content and the viscosity index of Group III base stocks of the present disclosure as compared to other Group III base stocks.

FIG. 1 shows an example of a processing configuration suitable for manufacturing the base stocks in this disclosure. FIG. 2 shows an example of a general processing configuration suitable for processing a feedstock to produce base stocks of the present disclosure. Note that R1 corresponds to 110 in FIG. 2; furthermore, R2, R3, R4, and R5 correspond to 120, 130, 140, and 150 from FIG. 2, respectively. Details on the processing configuration can be found in US Application 2015/715,555. In FIG. 2, a feedstock 105 can be introduced into a first reactor 110. A reactor such as first reactor 110 can include a feed inlet and an effluent outlet. First reactor 110 can correspond to a hydrotreating reactor, a hydrocracking reactor, or a combination thereof. Optionally, a plurality of reactors can be used to allow for selection of different conditions. For example, if both a first reactor 110 and optional second reactor 120 are included in the reaction system, first reactor 110 can correspond to a hydrotreatment reactor while second reactor 120 can correspond to a hydrocracking reactor. Yet other options for arranging reactor(s) and/or catalysts within the reactor(s) to perform initial hydrotreating and/or hydrocracking of a feedstock can also be used. Optionally, if a configuration includes multiple reactors in the initial stage, a gas-liquid separation can be performed between reactors to allow for removal of light ends and contaminant gases. In aspects where the initial stage includes a hydrocracking reactor, the hydrocracking reactor in the initial stage can be referred to as an additional hydrocracking reactor.

The hydroprocessed effluent 125 from the final reactor (such as reactor 120) of the initial stage can then be passed into a fractionator 130, or another type of separation stage. Fractionator 130 (or other separation stage) can separate the hydroprocessed effluent to form one or more fuel boiling range fractions 137, a light ends fraction 132, and a lubricant boiling range fraction 135. The lubricant boiling range fraction 135 can often correspond to a bottoms fraction from the fractionator 130. The lubricant boiling range fraction 135 can undergo further hydrocracking in second stage hydrocracking reactor 140. The effluent 145 from second stage hydrocracking reactor 140 can then be passed into a dewaxing/hydrofinishing reactor 150 to further improve the properties of the eventually produced lubricant boiling range products. In the configuration shown in FIG. 2, the effluent 155 from second stage dewaxing/hydrofinishing reactor 150 can be fractionated 160 to separate out light ends 152 and/or fuel boiling range fraction(s) 157 from one or more desired lubricant boiling range fractions 155.

The configuration in FIG. 2 can allow the second stage hydrocracking reactor 140 and the dewaxing/hydrofinishing reactor 150 to be operated under sweet processing conditions, corresponding to the equivalent of a feed (to the second stage) sulfur content of 100 wppm or less. Under such "sweet" processing conditions, the configuration in FIG. 2, in combination with use of a high surface area, low acidity catalyst, can allow for production of a hydrocracked effluent having a reduced or minimized content of aromatics.

In the configuration shown in FIG. 2, the final reactor (such as reactor 120) in the initial stage can be referred to as being in direct fluid communication with an inlet to the fractionator 130 (or an inlet to another type of separation stage). The other reactors in the initial stage can be referred to as being in indirect fluid communication with the inlet to the separation stage, based on the indirect fluid communication provided by the final reactor in the initial stage. The reactors in the initial stage can generally be referred to as being in fluid communication with the separation stage, based on either direct fluid communication or indirect fluid communication. In some optional aspects, one or more recycle loops can be included as part of a reaction system configuration. Recycle loops can allow for quenching of effluents between reactors/stages as well as quenching within a reactor/stage.

In an embodiment, a feedstock is introduced into a reactor under hydrotreating conditions. The hydrotreated effluent is then passed to a fractionator where the effluent is separated into fuel boiling range fractions and lubricant boiling range fractions. The lubricant boiling range fractions are then passed to a second stage where hydrocracking, dewaxing and hydrofinishing steps are performed. The effluent from the second stage is then passed to a fractionator where the Group III base stocks of the present disclosure are recovered.

Feedstocks

A wide range of petroleum and chemical feedstocks can be hydroprocessed in accordance with the invention. Suitable feedstocks include whole and reduced petroleum crudes such as Arab Light, extra Light, Midland Sweet, Delaware Basin, West Texas Intermediate, Eagle Ford, Murban and Mars, atmospheric, cycle oils, gas oils, including vacuum gas oils and coker gas oils, light to heavy distillates including raw virgin distillates, hydrocrackates, hydrotreated oils, petroleum-derived waxes (including slack waxes), Fischer-Tropsch waxes, raffinates, deasphalted oils, and mixtures of these materials.

One way of defining a feedstock is based on the boiling range of the feed. One option for defining a boiling range is to use an initial boiling point for a feed and/or a final boiling point for a feed. Another option is to characterize a feed based on the amount of the feed that boils at one or more temperatures. For example, a "T5" boiling point/distillation point for a feed is defined as the temperature at which 5 wt % of the feed will boil off. Similarly, a "T95" boiling point/distillation point is a temperature at which 95 wt % of the feed will boil. Boiling points, including fractional weight boiling points, can be determined using an appropriate ASTM test method, such as the procedures described in ASTM D2887, D2892, D6352, D7129, and/or D86.

Typical feeds include, for example, feeds with an initial boiling point of at least 600° F. (~316° C.); similarly, the T5 and/or T10 boiling point of the feed can be at least 600° F. (~316° C.). Additionally or alternately, the final boiling point of the feed can be 1100° F. (~593° C.) or less; similarly, the T95 boiling point and/or T90 boiling point of the feed can also be 1100° F. (~593° C.) or less. As one non-limiting example, a typical feed can have a T5 boiling point of at least 600° F. (~316° C.) and a T95 boiling point of 1100° F. (~593° C.) or less. Optionally, if the hydroprocessing is also used to form fuels, the feed may include a lower boiling range portion. For example, such a feed can have an initial boiling point of at least 350° F. (~177° C.) and a final boiling point of 1100° F. (~593° C.) or less.

In some aspects, the aromatics content of the feed, as determined by UV-Vis absorption or equivalent methods such as ASTM D7419 or ASTM D2007, can be at least 20 wt %, or at least 25 wt %, or at least 30 wt %, or at least 40 wt %, or at least 50 wt %, or at least 60 wt %, such as up 15 to 75 wt % or up to 90 wt %. In particular, the aromatics content can be 25 wt % to 75 wt %, or 25 wt % to 90 wt %, or 35 wt % to 75 wt %, or 35 wt % to 90 wt %. In other aspects, the feed can have a lower aromatics content, such as an aromatics content of 35 wt % or less, or 25 wt % or less, such as down to 0 wt %. In particular, the aromatics content can be 0 wt % to 35 wt %, or 0 wt % to 25 wt %, or 5.0 wt % to 35 wt %, or 5.0 wt % to 25 wt %.

Particular feed stock components useful in processes of the present disclosure include vacuum gas oil feed stocks (e.g., medium vacuum gas oil feeds (MVGO)) having a solvent dewaxed oil feed viscosity index of from at least 45, at least 50, at least 55, or at least 60 to 150, such as from 65 to 125, at least 65 to 110 from 65 to 100 or 65 to 90.

Other particular feed stock components useful in processes of the present disclosure include feed stocks having a mixed vacuum gas oil feed (e.g., medium vacuum gas oil feed (MVGO)) and a heavy atmospheric gas oil feed, in which the mixed feed stock has a solvent dewaxed oil feed viscosity index of from at least 45, at least 55, at least 60 to 150, such as from 65 to 145, from 65 to 125, from 65 to 100 or 65 to 90.

In aspects where the hydroprocessing includes a hydrotreatment process and/or a sour hydrocracking process, the feed can have a sulfur content of 500 wppm to 20000 wppm or more, or 500 wppm to 10000 wppm, or 500 wppm to 5000 wppm. Additionally or alternately, the nitrogen content of such a feed can be 20 wppm to 4000 wppm, or 50 wppm to 2000 wppm. In some aspects, the feed can correspond to a "sweet" feed, so that the sulfur content of the feed is 25 wppm to 500 wppm and/or the nitrogen content is 1 wppm to 100 wppm.

First Hydroprocessing Stage—Hydrotreating and/or Hydrocracking

In various aspects, a first hydroprocessing stage can be used to improve one or more qualities of a feedstock for lubricant base oil production. Examples of improvements of a feedstock can include, but are not limited to, reducing the heteroatom content of a feed, performing conversion on a feed to provide viscosity index uplift, and/or performing aromatic saturation on a feed.

With regard to heteroatom removal, the conditions in the initial hydroprocessing stage (hydrotreating and/or hydrocracking) can be sufficient to reduce the sulfur content of the hydroprocessed effluent to 250 wppm or less, or 200 wppm or less, or 150 wppm or less, or 100 wppm or less, or 50 wppm or less, or 25 wppm or less, or 10 wppm or less. In particular, the sulfur content of the hydroprocessed effluent can be 1 wppm to 250 wppm, or 1 wppm to 50 wppm, or 1 wppm to 10 wppm. Additionally or alternately, the conditions in the initial hydroprocessing stage can be sufficient to reduce the nitrogen content to 100 wppm or less, or 50 wppm or less, or 25 wppm or less, or 10 wppm or less. In particular, the nitrogen content can be 1 wppm to 100 wppm, or 1 wppm to 25 wppm, or 1 wppm to 10 wppm.

In aspects that include hydrotreating as part of the initial hydroprocessing stage, the hydrotreating catalyst can comprise any suitable hydrotreating catalyst, e.g., a catalyst comprising at least one Group 8-10 non-noble metal (for example selected from Ni, Co, and a combination thereof) and at least one Group 6 metal (for example selected from Mo, W, and a combination thereof), optionally including a suitable support and/or filler material (e.g., comprising alumina, silica, titania, zirconia, or a combination thereof). The hydrotreating catalyst according to aspects of this invention can be a bulk catalyst or a supported catalyst. Techniques for producing supported catalysts are well known in the art. Techniques for producing bulk metal catalyst particles are known and have been previously described, for example in U.S. Pat. No. 6,162,350, which is hereby incorporated by reference. Bulk metal catalyst particles can be made via methods where all of the metal catalyst precursors are in solution, or via methods where at least one of the precursors is in at least partly in solid form, optionally but preferably while at least another one of the precursors is provided only in a solution form. Providing a metal precursor at least partly in solid form can be achieved, for example, by providing a solution of the metal precursor that also includes solid and/or precipitated metal in the solution, such as in the form of suspended particles. By way of illustration, some examples of suitable hydrotreating catalysts are described in one or more of U.S. Pat. Nos. 6,156,695, 6,162,350, 6,299,760, 6,582,590, 6,712,955, 6,783,663, 6,863,803, 6,929,738, 7,229,548, 7,288,182, 7,410,924, 7,544,632, and 8,294,255, U.S. Patent Application Publication Nos. 2005/0277545, 2006/0060502, 2007/0084754, and 2008/0132407, and International Publication Nos. WO 04/007646, WO 2007/084437, WO 2007/084438, WO 2007/084439, and WO 2007/084471, inter alia. Preferred metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina.

In various aspects, hydrotreating conditions can include temperatures of 200° C. to 450° C., or 315° C. to 425° C.; pressures of 250 psig (~1.8 MPag) to 5000 psig (~34.6 MPag) or 500 psig (~3.4 MPag) to 3000 psig (~20.8 MPag), or 800 psig (~5.5 MPag) to 2500 psig (~17.2 MPag); Liquid Hourly Space Velocities (LHSV) of 0.2-10 hr$^{-1}$; and hydrogen treat rates of 200 scf/B (35.6 m3/m3) to 10,000 scf/B (1781 m3/m3), or 500 (89 m3/m3) to 10,000 scf/B (1781 m3/m3).

Hydrotreating catalysts are typically those containing Group 6 metals, and non-noble Group 8-10 metals, i.e., iron, cobalt and nickel and mixtures thereof. These metals or mixtures of metals are typically present as oxides or sulfides on refractory metal oxide supports. Suitable metal oxide supports include low acidic oxides such as silica, alumina or titania, preferably alumina. In some aspects, preferred aluminas can correspond to porous aluminas such as gamma or eta having average pore sizes from 50 to 200 Å, or 75 to 150 Å; a surface area from 100 to 300 m2/g, or 150 to 250 m2/g; and/or a pore volume of from 0.25 to 1.0 cm3/g, or 0.35 to 0.8 cm3/g. The supports are preferably not promoted with a halogen such as fluorine as this generally increases the acidity of the support.

The external surface area and the micropore surface area refer to one way of characterizing the total surface area of a catalyst. These surface areas are calculated based on analysis of nitrogen porosimetry data using the BET method for surface area measurement. See, for example, Johnson, M. F. L., Jour. Catal., 52, 425 (1978). The micropore surface area refers to surface area due to the unidimensional pores of the zeolite in the catalyst. Only the zeolite in a catalyst will contribute to this portion of the surface area. The external surface area can be due to either zeolite or binder within a catalyst.

Alternatively, the hydrotreating catalyst can be a bulk metal catalyst, or a combination of stacked beds of supported and bulk metal catalyst. By bulk metal, it is meant that the catalysts are unsupported wherein the bulk catalyst particles comprise 30-100 wt. % of at least one Group 8-10 non-noble metal and at least one Group 6 metal, based on the total weight of the bulk catalyst particles, calculated as metal oxides and wherein the bulk catalyst particles have a surface area of at least 10 m2/g. It is furthermore preferred that the bulk metal hydrotreating catalysts used herein comprise 50 to 100 wt %, and even more preferably 70 to 100 wt %, of at least one Group 8-10 non-noble metal and at least one Group 6 metal, based on the total weight of the particles, calculated as metal oxides. The amount of Group 6 and Group 8-10 non-noble metals can be determined via TEM-EDX.

Bulk catalyst compositions comprising one Group 8-10 non-noble metal and two Group 6 metals are preferred. It has been found that in this case, the bulk catalyst particles are sintering-resistant. Thus the active surface area of the bulk catalyst particles is maintained during use. The molar ratio of Group 6 to Group 8-10 non-noble metals ranges generally from 10:1-1:10 and preferably from 3:1-1:3. In the case of a core-shell structured particle, these ratios of course apply to the metals contained in the shell. If more than one Group 6 metal is contained in the bulk catalyst particles, the ratio of the different Group 6 metals is generally not critical. The same holds when more than one Group 8-10 non-noble metal is applied. In the case where molybdenum and tungsten are present as Group 6 metals, the molybenum:tungsten ratio preferably lies in the range of 9:1-1:9. Preferably the Group 8-10 non-noble metal comprises nickel and/or cobalt. It is further preferred that the Group 6 metal comprises a combination of molybdenum and tungsten. Preferably, combinations of nickel/molybdenum/tungsten and cobalt/molybdenum/tungsten and nickel/cobalt/molybdenum/tungsten are used. These types of precipitates appear to be sinter-resistant. Thus, the active surface area of the precipitate is maintained during use. The metals are preferably present as oxidic compounds of the corresponding metals, or if the catalyst composition has been sulfided, sulfidic compounds of the corresponding metals.

In some optional aspects, the bulk metal hydrotreating catalysts used herein have a surface area of at least 50 m$^2$/g and more preferably of at least 100 m$^2$/g. In such aspects, it is also desired that the pore size distribution of the bulk metal hydrotreating catalysts be approximately the same as the one of conventional hydrotreating catalysts. Bulk metal hydrotreating catalysts can have a pore volume of 0.05-5 ml/g, or of 0.1-4 ml/g, or of 0.1-3 ml/g, or 0.1-2 tag determined by nitrogen adsorption. Preferably, pores smaller than 1 nm are not present. The bulk metal hydrotreating catalysts can have a median diameter of at least 50 nm, or at least 100 nm. The bulk metal hydrotreating catalysts can have a median diameter of not more than 5000 µm, or not more than 3000 µm. In an embodiment, the median particle diameter lies in the range of 0.1-50 µm and most preferably in the range of 0.5-50 µm.

Examples of suitable hydrotreating catalysts include, but are not limited to, Albemarle KF 848, KF 860, KF 868, KF 870, KF 880, KF 861, KF 905, KF 907, and Nebula; Criterion LH-21, LH-22, and DN-3552; Haldor-Topsøe TK-560 BRIM, TK-562 HyBRIM, TK-565 HyBRIM, TK-569 HyBRIM, TK-907, TK-911, and TK-951; Axens HR 504, HR 508, HR 526, and HR 544. Hydrotreating may be carried out by one catalyst or combinations of the previously listed catalysts.

Second-Stage Processing—Hydrocracking or Conversion Conditions

In various aspects, instead of using a conventional hydrocracking catalyst in a second (sweet) reaction stage for conversion of a feed, a reaction system can include a high surface area, low acidity conversion catalyst as described herein. In aspects where a lubricant boiling range feed has a sufficiently low content of heteroatoms, such as a feed that corresponds to a "sweet" feed, the feed can be exposed to a high surface area, low acidity conversion catalyst as described herein without prior hydroprocessing to remove heteroatoms.

In various aspects, the conditions selected for conversion for lubricant base stock production can depend on the desired level of conversion, the level of contaminants in the input feed to the conversion stage, and potentially other factors. For example, hydrocracking and/or conversion conditions in a single stage, or in the first stage and/or the second stage of a multi-stage system, can be selected to achieve a desired level of conversion in the reaction system. Hydrocracking and/or conversion conditions can be referred to as sour conditions or sweet conditions, depending on the level of sulfur and/or nitrogen present within a feed and/or present in the gas phase of the reaction environment. For example, a feed with 100 wppm or less of sulfur and 50 wppm or less of nitrogen, preferably less than 25 wppm sulfur and/or less than 10 wppm of nitrogen, represent a feed for hydrocracking and/or conversion under sweet conditions. Feeds with sulfur contents of 250 wppm or more can be processed under sour conditions. Feeds with intermediate levels of sulfur can be processed either under sweet conditions or sour conditions.

In aspects that include hydrocracking as part of an initial hydroprocessing stage under sour conditions, the initial stage hydrocracking catalyst can comprise any suitable or standard hydrocracking catalyst, for example, a zeolitic base selected from zeolite Beta, zeolite X, zeolite Y, faujasite, ultrastable Y (USY), dealuminized Y (Deal Y), Mordenite, ZSM-3, ZSM-4, ZSM-18, ZSM-20, ZSM-48, and combinations thereof, which zeolitic base can advantageously be loaded 20 with one or more active metals (e.g., either (i) a Group 8-10 noble metal such as platinum and/or palladium or (ii) a Group 8-10 non-noble metal such nickel, cobalt, iron, and combinations thereof, and a Group 6 metal such as molybdenum and/or tungsten). In this discussion, zeolitic materials are defined to include materials having a recognized zeolite framework structure, such as framework structures recognized by the International Zeolite Association. Such zeolitic materials can correspond to silicoaluminates, silicoaluminophosphates, aluminophosphates, and/or other combinations of atoms that can be used to form a zeolitic framework structure. In addition to zeolitic materials, other types of crystalline acidic support materials may also be suitable. Optionally, a zeolitic material and/or other crystalline acidic material may be mixed or bound with other metal oxides such as alumina, titania, and/or silica. Details on suitable hydrocracking catalysts can be found in US2015/715,555.

In some optional aspects, a high surface area, low acidity conversion catalyst as described herein can optionally be used as part of the catalyst in an initial stage.

A hydrocracking process in a first stage (or otherwise under sour conditions) can be carried out at temperatures of 200° C. to 450° C., hydrogen partial pressures of from 250 psig to 5000 psig (~1.8 MPag to ~34.6 MPag), liquid hourly space velocities of from 0.2 hr$^{-1}$ to 10 hr$^{-1}$, and hydrogen treat gas rates of from 35.6 m3/m3 to 1781 m3/m3 (~200 SCF/B to ~10,000 SCF/B), Typically, in most cases, the conditions can include temperatures in the range of 300° C. to 450° C., hydrogen partial pressures of from 500 psig to 2000 psig (~3.5 MPag to ~13.9 MPag), liquid hourly space velocities of from 0.3 hr$^{-1}$ to 5 hr$^{-1}$ and hydrogen treat gas rates of from 213 m3/m3 to 1068 m3/m3 (~1200 SCF/B to ~6000 SCF/B).

In a multi-stage reaction system, a first reaction stage of the hydroprocessing reaction system can include one or more hydrotreating and/or hydrocracking catalysts. A separator can then be used in between the first and second stages of the reaction system to remove gas phase sulfur and nitrogen contaminants. One option for the separator is to simply perform a gas-liquid separation to remove contaminants. Another option is to use a separator such as a flash separator that can perform a separation at a higher temperature. Such a high temperature separator can be used, for example, to separate the feed into a portion boiling below a temperature cut point, such as about 350° F. (177° C.) or about 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least about 350° F. (177° C.) or at least about 400° F. (204° C.) to having an upper end cut point temperature of about 700° F. (371° C.) or less or 650° F. (343° C.) or less. Optionally, the distillate fuel range can be extended to include additional kerosene, such as by selecting a lower end cut point temperature of at least about 300° F. (149° C.).

In aspects where the inter-stage separator is also used to produce a distillate fuel fraction, the portion boiling below the distillate fuel fraction includes, naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents the potential lubricant base stocks. In such aspects, the portion boiling above the distillate fuel boiling range is subjected to further hydroprocessing in a second hydroprocessing stage. The portion boiling above the distillate fuel boiling range can correspond to a lubricant boiling range fraction, such as a fraction having a T5 or T10 boiling point of at least about 343° C. Optionally, the lighter lube fractions can be distilled and operated in the catalyst dewaxing sections in a blocked operation where the conditions are adjusted to maximize the yield and properties of each lube cut.

A conversion process under sweet conditions can be performed under conditions similar to those used for a sour hydrocracking process, or the conditions can be different. In an embodiment, the conditions in a sweet conversion stage can have less severe conditions than a hydrocracking process in a sour stage. Suitable conversion conditions for a non-sour stage can include, but are not limited to, conditions similar to a first or sour stage. Suitable conversion conditions can include temperatures of about 550° F. (288° C.) to about 840° F. (449° C.), hydrogen partial pressures of from about 1000 psia to about 5000 psia (~6.9 MPa-a to 34.6 MPa-a), liquid hourly space velocities of from 0.05 $hr^{-1}$ to 10 $hr^{-1}$, and hydrogen treat gas rates of from 35.6 m3/m3 to 1781 m3/m3 (200 SCF/B to 10,000 SCF/B). In other embodiments, the conditions can include temperatures in the range of about 600° F. (343° C.) to about 815° F. (435° C.), hydrogen partial pressures of from about 1000 psia to about 3000 psia (~6.9 MPa-a to 20.9 MPa-a), and hydrogen treat gas rates of from about 213 m3/m3 to about 1068 m3/m3 (1200 SCF/B to 6000 SCF/B). The LHSV can be from about 0.25 $hr^{-1}$ to about 50 $hr^{-1}$, or from about 0.5 $hr^{-1}$ to about 20 $hr^{-1}$, and preferably from about 1.0 $hr^{-1}$ to about 4.0 $hr^{-1}$.

In still another aspect, the same conditions can be used for hydrotreating, hydrocracking, and/or conversion beds or stages, such as using hydrotreating conditions for all beds or stages, using hydrocracking conditions for all beds or stages, and/or using conversion conditions for all beds or stages. In yet another embodiment, the pressure for the hydrotreating, hydrocracking, and/or conversion beds or stages can be the same.

In yet another aspect, a hydroprocessing reaction system may include more than one hydrocracking and/or conversion stage. If multiple hydrocracking and/or conversion stages are present, at least one hydrocracking stage can have effective hydrocracking conditions as described above, including a hydrogen partial pressure of at least about 1000 psia (~6.9 MPa-a). In such an aspect, other (subsequent) conversion processes can be performed under conditions that may include lower hydrogen partial pressures. Suitable conversion conditions for an additional conversion stage can include, but are not limited to, temperatures of about 550° F. (288° C.) to about 840° F. (449° C.), hydrogen partial pressures of from about 250 psia to about 5000 psia (1.8 MPa-a to 34.6 MPa-a), liquid hourly space velocities of from 0.05 $hr^{-1}$ to 10 $hr^{-1}$, and hydrogen treat gas rates of from 35.6 m3/m3 to 1781 m3/m3 (200 SCF/5 B to 10,000 SCF/B). In other embodiments, the conditions for an additional conversion stage can include temperatures in the range of about 600° F. (343° C.) to about 815° F. (435° C.), hydrogen partial pressures of from about 500 psia to about 3000 psia (3.5 MPa-a to 20.9 MPa-a), and hydrogen treat gas rates of from about 213 m3/m3 to about 1068 m3/m3 (1200 SCF/B to 6000 SCF/B). The LHSV can be from about 0.25 $hr^{-1}$ to about 50 $hr^{-1}$, or from about 0.5 $hr^{-1}$ to about 20 $hr^{-1}$, and preferably from about 1.0 $hr^{-1}$ to about 4.0 $hr^{-1}$.

Additional Second Stage Processing—Dewaxing and Hydrofinishing/Aromatic Saturation In various aspects, catalytic dewaxing can be included as part of a second and/or sweet and/or subsequent processing stage, such as a processing stage that also includes conversion in the presence of a high surface area, low acidity catalyst. Preferably, the dewaxing catalysts are zeolites (and/or zeolitic crystals) that perform dewaxing primarily by isomerizing a hydrocarbon feedstock. More preferably, the catalysts are zeolites with a unidimensional pore structure. Suitable catalysts include 10-member ring pore zeolites, such as EU-1, ZSM-35 (or ferrierite), ZSM-11, ZSM-57, NU-87, SAPO-11, and ZSM-22. Preferred materials are EU-2, EU-11, ZBM-30, ZSM-48, or ZSM-23. ZSM-48 is most preferred. Note that a zeolite having the ZSM-23 structure with a silica to alumina ratio of from 20:1 to 40:1 can sometimes be referred to as SSZ-32. Other zeolitic crystals that are isostructural with the above materials include Theta-1, NU-10, EU-13, KZ-1, and NU-23. U.S. Pat. Nos. 7,625,478, 7,482,300, 5,075,269 and 4,585,747 further disclose dewaxing catalysts useful in the process of the present disclosure, all of which are incorporated herein by reference.

In various embodiments, the dewaxing catalysts can further include a metal hydrogenation component. The metal hydrogenation component is typically a Group 6 and/or a Group 8-10 metal. Preferably, the metal hydrogenation component is a Group 8-10 noble metal. Preferably, the metal hydrogenation component is Pt, Pd, or a mixture thereof. In an alternative preferred embodiment, the metal hydrogenation component can be a combination of a non-noble Group 8-10 metal with a Group 6 metal. Suitable combinations can include Ni, Co, or Fe with Mo or W, preferably Ni with Mo or W.

The metal hydrogenation component may be added to the dewaxing catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the dewaxing catalyst can be at least 0.1 wt % based on catalyst, or at least 0.15 wt %, or at least 0.2 wt %, or at least 0.25 wt %, or at least 0.3 wt %, or at least 0.5 wt % based on catalyst. The amount of metal in the catalyst can be 20 wt % or less based on catalyst, or 10 wt % or less, or 5 wt % or less, or 2.5 wt % or less, or 1 wt % or less. For aspects where the metal is Pt, Pd, another Group 8-10 noble metal, or a combination thereof, the amount of metal can be from 0.1 to 5 wt %, preferably from 0.1 to 2 wt %, or 0.25 to 1.8 wt %, or 0.4 to 1.5 wt %. For aspects where the metal is a combination of a non-noble Group 8-10 metal with a Group 6 metal, the combined amount of metal can be from 0.5 wt % to 20 wt %, or 1 wt % to 15 wt %, or 2.5 wt % to 10 wt %.

Preferably, a dewaxing catalyst can be a catalyst with a low ratio of silica to alumina. For example, for ZSM-48, the ratio of silica to alumina in the zeolite can be less than 200:1, or less than 110:1, or less than 100:1, or less than 90:1, or less than 80:1. In particular, the ratio of silica to alumina can be from 30:1 to 200:1, or 60:1 to 110:1, or 70:1 to 100:1.

A dewaxing catalyst can also include a binder. In some embodiments, the dewaxing catalysts used in process according to the invention are formulated using a low surface area binder, a low surface area binder represents a binder with a surface area of 100 m2/g or less, or 80 m2/g or less, or 70 m2/g or less, such as down to 40 m2/g or still lower.

Alternatively, the binder and the zeolite particle size can be selected to provide a catalyst with a desired ratio of micropore surface area to total surface area. In dewaxing catalysts used according to the invention, the micropore surface area corresponds to surface area from the unidimensional pores of zeolites in the dewaxing catalyst. The total surface corresponds to the micropore surface area plus the external surface area. Any binder used in the catalyst will not contribute to the micropore surface area and will not significantly increase the total surface area of the catalyst. The external surface area represents the balance of the surface area of the total catalyst minus the micropore surface area. Both the binder and zeolite can contribute to the value of the external surface area. Preferably, the ratio of micropore surface area to total surface area for a dewaxing catalyst will be equal to or greater than 25%.

A zeolite (or other zeolitic material) can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. Optionally, a binder can be composed of two or more metal oxides can also be used.

Process conditions in a catalytic dewaxing zone can include a temperature of from 200 to 450° C., preferably 270 to 400° C., a hydrogen partial pressure of from 1.8 to 34.6 MPag (~250 to ~5000 psi), preferably 4.8 to 20.8 MPag, a liquid hourly 5 space velocity of from 0.2 to 10 hr-1, preferably 0.5 to 3.0 hr-1, and a hydrogen circulation rate of from 35.6 to 1781 m3/m3 (~200 to ~10,000 SCF/B), preferably 178 to 890.6 m3/m3 (~1000 to ~5000 scf/B). Additionally or alternately, the conditions can include temperatures in the range of 600° F. (~343° C.) to 815° F. (~435° C.), hydrogen partial pressures of from 500 psig to 3000 psig (~3.5 MPag to ~20.9 MPag), and hydrogen treat gas rates of from 213 m3/m3 to 1068 m3/m3 (~1200 SCF/B to ~6000 SCF/B).

In various aspects, a hydrofinishing and/or aromatic saturation process can also be provided. The hydrofinishing and/or aromatic saturation can occur prior to dewaxing and/or after dewaxing. The hydrofinishing and/or aromatic saturation can occur either before or after fractionation. If hydrofinishing and/or aromatic saturation occurs after fractionation, the hydrofinishing can be performed on one or more portions of the fractionated product, such as being performed on one or more lubricant base stock portions. Alternatively, the entire effluent from the last conversion or dewaxing process can be hydrofinished and/or undergo aromatic saturation.

In some situations, a hydrofinishing process and an aromatic saturation process can refer to a single process performed using the same catalyst. Alternatively, one type of catalyst or catalyst system can be provided to perform aromatic saturation, while a second catalyst or catalyst system can be used for hydrofinishing. Typically a hydrofinishing and/or aromatic saturation process will be performed in a separate reactor from dewaxing or hydrocracking processes for practical reasons, such as facilitating use of a lower temperature for the hydrofinishing or aromatic saturation process. However, an additional hydrofinishing reactor following a hydrocracking or dewaxing process but prior to fractionation could still be considered part of a second stage of a reaction system conceptually.

Hydrofinishing and/or aromatic saturation catalysts can include catalysts containing Group 6 metals, Group 8-10 metals, and mixtures thereof. In an embodiment, preferred metals include at least one metal sulfide having a strong hydrogenation function. In another embodiment, the hydrofinishing catalyst can include a Group 8-10 noble metal, such as Pt, Pd, or a combination thereof. The mixture of metals may also be present as bulk metal catalysts wherein the amount of metal is 30 wt. % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41. If separate catalysts are used for aromatic saturation and hydrofinishing, an aromatic saturation catalyst can be selected based on activity and/or selectivity for aromatic saturation, while a hydrofinishing catalyst can be selected based on activity for improving product specifications, such as product color and polynuclear aromatic reduction. U.S. Pat. Nos. 7,686,949, 7,682,502 and 8,425,762 further disclose catalysts useful in the process of the present disclosure, all of which are incorporated herein by reference.

Hydrofinishing conditions can include temperatures from 125° C. to 425° C., preferably 180° C. to 280° C., total pressures from 500 psig (~3.4 MPag) to 3000 psig (~20.7 MPag), preferably 1500 psig (~10.3 MPag) to 2500 psig (~17.2 MPag), and liquid hourly space velocity (LHSV) from 0.1 hr-1 to 5 hr-1, preferably 0.5 hr-1 to 1.5 hr-1.

A second fractionation or separation can be performed at one or more locations after a second or subsequent stage. In some aspects, a fractionation can be performed after hydrocracking in the second stage in the presence of the USY catalyst under sweet conditions. At least a lubricant boiling range portion of the second stage hydrocracking effluent can then be sent to a dewaxing and/or hydrofinishing reactor for further processing. In some aspects, hydrocracking and dewaxing can be performed prior to a second fractionation. In some aspects, hydrocracking, dewaxing, and aromatic saturation can be performed prior to a second fractionation. Optionally, aromatic saturation and/or hydrofinishing can be performed before a second fractionation, after a second fractionation, or both before and after.

If a lubricant base stock product is desired, the lubricant base stock product can be further fractionated to form a plurality of products. For example, lubricant base stock products can be made corresponding to a 2 cSt cut, a 4 cSt cut, a 6 cSt cut, and/or a cut having a viscosity higher than 6 cSt. For example, a lubricant base oil product fraction having a viscosity of at least 2 cSt can be a fraction suitable for use in low pour point application such as transformer oils, low temperature hydraulic oils, or automatic transmission fluid. A lubricant base oil product fraction having a viscosity of at least 4 cSt can be a fraction having a controlled volatility and low pour point, such that the fraction is suitable for engine oils made according to SAE J300 in 0W- or 5W- or 10W-grades. This fractionation can be performed at the time the diesel (or other fuel) product from the second stage is separated from the lubricant base stock product, or the fractionation can occur at a later time. Any hydrofinishing and/or aromatic saturation can occur either before or after fractionation. After fractionation, a lubricant base oil product fraction can be combined with appropriate additives for use as an engine oil or in another lubrication service. Illustrative process flow schemes useful in this disclosure are disclosed in U.S. Pat. Nos. 8,992,764, 8,394,255, U.S. Patent Application Publication No. 2013/0264246, and U.S. Patent Application Publication No. 2015/715,555 the disclosures of which are incorporated herein by reference in their entirety.

Lubricating Oil Additives

A base oil constitutes the major component of the engine or other mechanical component oil lubricant composition of the present disclosure and typically is present in an amount from about 50 to about 99 weight percent, preferably from about 70 to about 95 weight percent, and more preferably from about 85 to about 95 weight percent, based on the total weight of the composition. As described herein, additives constitute the minor component of the engine or other mechanical component oil lubricant composition of the present disclosure and typically are present in an amount ranging from about less than 50 weight percent, preferably less than about 30 weight percent, and more preferably less than about 15 weight percent, based on the total weight of the composition.

Mixtures of base oils may be used if desired, for example, a base stock component and a co-base stock component. The co-base stock component is present in the lubricating oils of this disclosure in an amount from about 1 to about 99 weight percent, preferably from about 5 to about 95 weight percent, and more preferably from about 10 to about 90 weight percent, based on the total weight of the composition. In a preferred aspect of the present disclosure, the low-viscosity and the high-viscosity base stocks are used in the form of a base stock blend that comprises from 5 to 95 wt. % of the low-viscosity base stock and from 5 to 95 wt. % of the high-viscosity base stock. Preferred ranges include from 10 to 90 wt. % of the low-viscosity base stock and from 10 to 90 wt. % of the high-viscosity base stock. The base stock blend can be present in the engine or other mechanical component oil lubricant composition from 15 to 85 wt. % of the low-viscosity base stock and from 15 to 85 wt. % of the high-viscosity base stock, preferably from 20 to 80 wt. % of the low-viscosity base stock and from 20 to 80 wt. % of the high-viscosity base stock, and more preferably from 25 to 75 wt. % of the low-viscosity base stock and from 25 to 75 wt. % of the high-viscosity base stock, based on the total weight of the oil lubricant composition.

In one aspect of the present disclosure, a low-viscosity, medium viscosity and/or high viscosity base stock is present in the engine or other mechanical component oil lubricant composition in an amount of from about 50 to about 99 weight percent, preferably from about 70 to about 95 weight percent, and more preferably from about 85 to about 95 weight percent, based on the total weight of the composition.

The formulated lubricating oil useful in the present disclosure may contain one or more of the other commonly used lubricating oil performance additives including but not limited to antiwear additives, detergents, dispersants, viscosity modifiers, corrosion inhibitors, rust inhibitors, metal deactivators, extreme pressure additives, anti-seizure agents, wax modifiers, other viscosity modifiers, fluid-loss additives, seal compatibility agents, lubricity agents, anti-staining agents, chromophoric agents, defoamants, demulsifiers, emulsifiers, densifiers, wetting agents, gelling agents, tackiness agents, colorants, and others. For a review of many commonly used additives, see "Lubricant Additives, Chemistry and Applications", Ed. L. R. Rudnick, Marcel Dekker, Inc. 270 Madison Ave. New York, N.J. 10016, 2003, and Klamann in Lubricants and Related Products, Verlag Chemie, Deerfield Beach, Fla.; ISBN 0-89573-177-0. Reference is also made to "Lubricant Additives" by M. W. Ranney, published by Noyes Data Corporation of Parkridge, N.J. (1973); see also U.S. Pat. No. 7,704,930, the disclosure of which is incorporated herein in its entirety. These additives are commonly delivered with varying amounts of diluent oil that may range from 5 weight percent up to greater than 90 weight percent.

The additives useful in this disclosure do not have to be soluble in the lubricating oils. Insoluble additives such as zinc stearate in oil can be dispersed in the lubricating oils of this disclosure.

When lubricating oil compositions contain one or more additives, the additive(s) are blended into the composition in an amount sufficient for it to perform its intended function. As stated above, additives are typically present in lubricating oil compositions as a minor component, typically in an amount of less than 50 weight percent, preferably less than about 30 weight percent, and more preferably less than about 15 weight percent, based on the total weight of the composition. Additives are most often added to lubricating oil compositions in an amount of at least 0.1 weight percent, preferably at least 1 weight percent, more preferably at least 5 weight percent. Typical amounts of such additives useful in the present disclosure are shown in Table 1 below.

It is noted that many of the additives are shipped from the additive manufacturer as a concentrate, containing one or more additives together, with a certain amount of base oil diluents. Accordingly, the weight amounts in the Table 1 below, as well as other amounts mentioned herein, are directed to the amount of active ingredient (that is the non-diluent portion of the ingredient). The weight percent (wt. %) indicated below is based on the total weight of the lubricating oil composition.

TABLE 2

Typical Amounts of Other Lubricating Oil Components

| Compound | Approximate wt. % (Useful) | Approximate wt. % (Preferred) |
|---|---|---|
| Dispersant | 0.1-20 | 0.1-8 |
| Detergent | 0.1-20 | 0.1-8 |
| Friction Modifier | 0.01-5 | 0.01-1.5 |
| Antioxidant | 0.1-5 | 0.1-1.5 |
| Pour Point Depressant (PPD) | 0.0-5 | 0.01-1.5 |
| Anti-foam Agent | 0.001-3 | 0.001-0.15 |
| Viscosity Modifier (solid polymer basis) | 0.1-2 | 0.1-1 |
| Antiwear | 0.2-3 | 0.5-1 |
| Inhibitor and Antirust | 0.01-5 | 0.01-1.5 |

The foregoing additives are all commercially available materials. These additives may be added independently but are usually precombined in packages which can be obtained from suppliers of lubricant oil additives. Additive packages with a variety of ingredients, proportions and characteristics are available and selection of the appropriate package will take the requisite use of the ultimate composition into account.

Lubricant compositions including the base stock of the instant disclosure have improved oxidative stability relative to conventional lubricant compositions including Group III base stocks. The low temperature and oxidation performance of lubricating oil base stocks in formulated lubricants are determined from MRV (mini-rotary viscometer) for low temperature performance measured by ASTM D4684, or for oxidation performance measured by oxidation stability time measured by pressure differential scanning calorimetry (CEC-L-85, which is the equivalent of ASTM D6186). The lubricating oils of this disclosure are particularly advantageous as passenger vehicle engine oil (PVEO) products.

The lubricating oil base stocks of this disclosure provide several advantages over typical conventional lubricating oil base stocks including, but not limited to, improved oxidation performance such as oxidation induction time measured by pressure differential scanning calorimetry (CEC-L-85, which is the equivalent of ASTM D6186) in engine oils.

The lube base stocks of the present disclosure are well suited as lube base stocks without blending limitations, and further, the lube base stock products are also compatible with lubricant additives for lubricant formulations.

The lube base stocks and lubricant compositions can be employed in the present disclosure in a variety of lubricant-related end uses, such as a lubricant oil or grease for a device or apparatus requiring lubrication of moving and/or interacting mechanical parts, components, or surfaces. Useful apparatuses include engines and machines. The lube base stocks of the present disclosure are suitable for use in the formulation of automotive crank case lubricants, automotive gear oils, transmission oils, many industrial lubricants including circulation lubricant, industrial gear lubricants, grease, compressor oil, pump oils, refrigeration lubricants, hydraulic lubricants and metal working fluids. Furthermore, the lube base stocks of this disclosure may be derived from renewable sources; such base stocks may qualify as sustainable product and can meet "sustainability" standards set by industry groups or government regulations.

The following non-limiting examples are provided to illustrate the disclosure.

EXAMPLES

For Examples 1 and 2, Feeds A and B were processed according to the process described in the present disclosure and depicted in FIG. 1. In particular, the feeds having the properties described in Table 3 were processed to produce the Group III base stocks of the present disclosure. After Stage 1 hydroprocessing, the intermediate feeds having the properties described in Table 4 were subjected to Stage 2 hydroprocessing to produce the Group III base stocks of the present disclosure. Feed A represented a raffinate feed with ~67 VI, and Feed B represented a high-quality VGO feed with ~92 VI.

Five different catalysts were used for processing in Examples 1 and 2, with details provided below. For both examples, stage 1 hydrotreating used catalysts A and B and stage 2 hydroprocessing used catalysts C, D, and E.

Catalyst A: Commercially available hydrotreating catalyst that consists of NiMo supported on $Al_2O_3$.

Catalyst B: Commercially available hydrotreating catalyst that consists of a bulk NiMoW oxide.

Catalyst C: 0.6 wt % Pt on USY, bounded with Versal-300 alumina. The USY had a ratio of silica to alumina ($SiO_2$: $Al_2O_3$) of roughly 75:1. USY is a zeolite with 12-member ring pore channels.

Catalyst D: Commercially available dewaxing catalyst that consists of Pt supported on ZSM-48.

Catalyst E: Commercially available hydrofinishing catalyst that consists of Pt/Pd supported on MCM-41.

Example 1

Feed A properties are shown in Table 3. The feed was hydrotreated at two conversion levels, namely 17% and 33%, and then blended (44.6/55.4) to give the product with properties shown in Table 3. For the dry wax amount, the amount of dry wax was corrected to the expected value at a pour point of −18° C. based on a correction of −0.33 wt %/° C. of pour point. For the viscosity index, the viscosity index was corrected to the expected value at a pour point of −18° C. based on a correction of 0.33 VI/° C. of pour point.

TABLE 3

|  | Feed A | Feed B |
|---|---|---|
| Solvent Dewaxed Oil VI @ −18° C. Pour | 67 | 92 |
| KV100 (cSt) | 5.302 | 5.063 |
| GC Distillation |  |  |
| Initial Boiling Pt (° C.) | 209 | 196 |
| 10% Off (° C.) | 328 | 343 |
| 50% Off (° C.) | 417 | 417 |
| 90% Off (° C.) | 495 | 509 |
| Final Boiling Pt (° C.) | 570 | 560 |
| N (ppm) | 666 | 297 |
| S (mass %) | 1.28 | 0.47 |
| % Dry Wax | 16.8 | 23.0 |
| Total Aromatics (mmol/kg) | 922 | 562 |
| 3+ Ring Aromatics (mmol/kg) | 312 | 185 |

TABLE 4

|  | Feed to Stage 2(A) Low Stage 1 Conversion | Feed to Stage 2(A) High Stage 1 Conversion | Feed to Stage 2(B) |
| --- | --- | --- | --- |
| Waxy VI | 118 | 129 | 144 |
| Solvent Dewaxed Oil VI @ −18° C. Pour | 98 | 111 | 124 |
| KV100 (cSt) | 5.1182 | 4.3955 | 4.4009 |
| GC Distillation |  |  |  |
| Initial Boiling Pt (° C.) | 335 | 335 | 331 |
| 10% Off (° C.) | 367 | 364 | 369 |
| 50% Off (° C.) | 420 | 415 | 418 |
| 90% Off (° C.) | 496 | 492 | 500 |
| Final Boiling Pt (° C.) | 579 | 568 | 547 |
| N (ppm) | 1 | <1 | <1 |
| S (ppm) | 7 | <5 | <5 |
| % Dry Wax | 18.7 | 21.6 | 33.9 |

Figure 4:
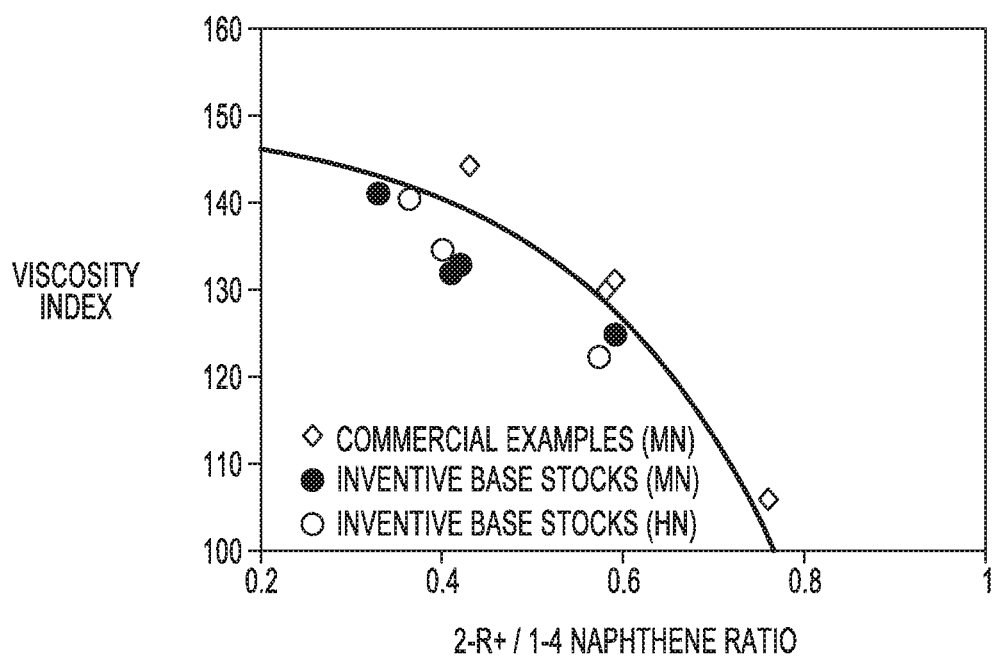
FIG. 4 is a graph illustrating the relationship between the ratio of molecules with multi-ring naphthenes to molecules with single ring naphthenes (2R+N/1RN) and the viscosity index of Group III base stocks of the present disclosure as compared to other Group III base stocks.
Figure 5:
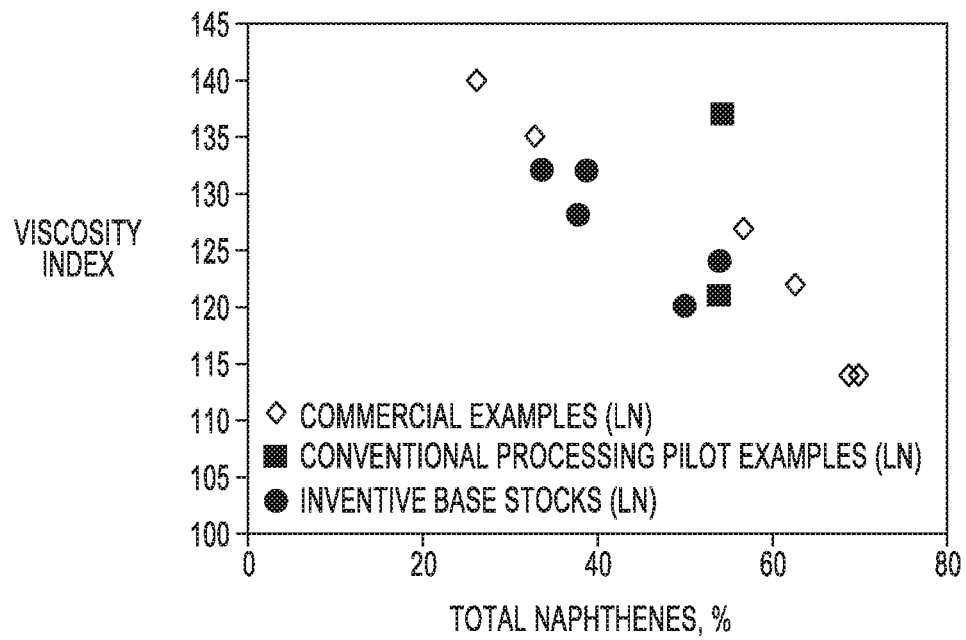
FIG. 5 is a graph illustrating the relationship between total naphthene content and the viscosity index of Group III base stocks of the present disclosure as compared to other Group III base stocks.
Figure 6:
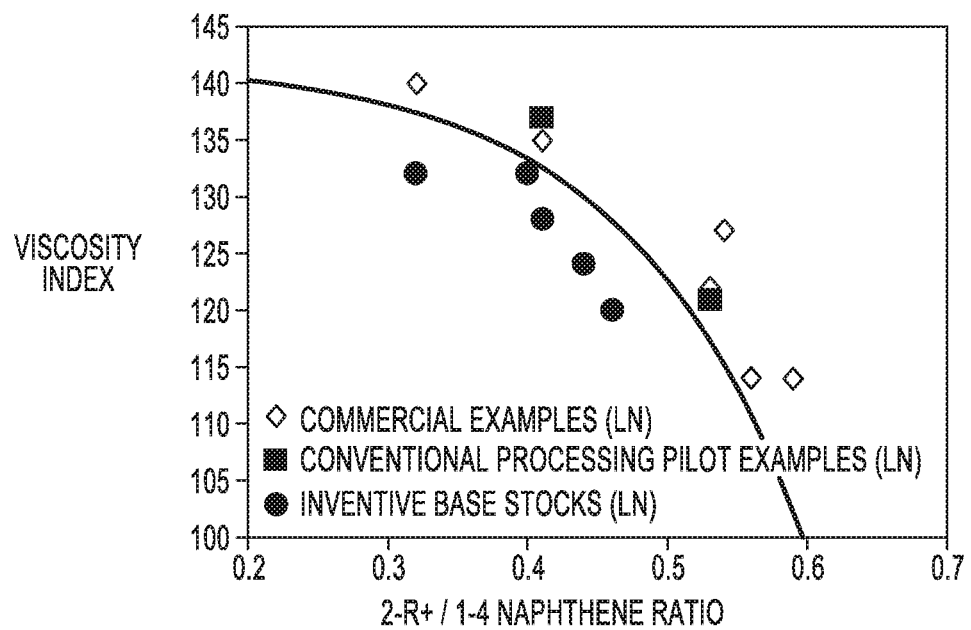
FIG. 6 is a graph illustrating the relationship between the ratio of molecules with multi-ring naphthenes to molecules with single ring naphthenes (2R+N/1RN) and the viscosity index of Group III base stocks of the present disclosure as compared to other Group III base stocks.

Feed A, having a solvent dewaxed oil feed viscosity index of about 67 was processed through the first stage which is primarily a hydrotreating unit which boosts viscosity index (VI) and removes sulfur and nitrogen. Both catalysts A and B were loaded in the same reactor, with the feed contacting catalyst A first. The hydrotreated feed was followed by a stripping section where light ends and diesel were removed. During Stage 1 hydrotreating, Feed A was split and underwent conversion at two different levels (labeled "low" and "high" conversion). The properties of the intermediate feeds (A1 and A2) are shown in Table 4. The heavier lube fractions from A1 and A2 then entered the second stage where hydrocracking, dewaxing, and hydrofinishing were performed. Various processing conditions for each of these steps (described below) were used to produce five Group III base stocks, A1-A6, the properties of which are shown in Tables 6 (4-5 cSt), 7 (5-7 cSt), and 8 (8-11 cSt). This combination of feed and process has been found to produce a Group III base stock with unique compositional characteristics. These unique compositional characteristics were observed in both the lower and higher viscosity base stocks produced as shown in FIGS. 4 and 6.

Processing conditions for each of the steps described above—hydrotreating, hydrocracking, catalytic dewaxing, and hydrofinishing—were tuned based on the desired conversion and VI of the final base stock products. The conditions used to manufacture the Group III base stocks that are the subject of this disclosure can be found in Table 5. The extent of 700° F.+ conversion in the first hydrotreating stage ranged from 20 to 40%, and processing conditions in the first stage included a temperature from 635° F. to 725° F.; hydrogen partial pressure from 500 psig to 3000 psig; liquid hourly space velocity from 0.5 hr$^{-1}$ to 1.5 hr$^-$; and a hydrogen circulation rate from 3500 scf/bbl to 6000 scf/bbl.

The second stage, which consisted of hydrocracking, catalytic dewaxing, and hydrofinishing, was carried out in a single reactor with a hydrogen partial pressure of 300 psig to 5000 psig; a hydrogen circulation rate from 1000 scf/bbl to 6000 scf/bbl Catalysts C, D, and E were loaded into the same reactor in the second stage and the feed contacted them in the order C, D, E. Process parameters were tuned to achieve a desired 700° F.+ conversion of 15-70%.

Processing conditions in the hydrocracking step included a temperature from 250° F. to 700° F.; a liquid hourly space velocity from 0.5 hr$^{-1}$ to 1.5 hr$^{-1}$. Processing conditions in the catalytic dewaxing step included a temperature from 250° F. to 660° F.; and liquid hourly space velocity from 1.0 hr$^{-1}$ to 3.0 hr$^{-1}$. Processing conditions in the hydrotreating step included a temperature from 250° F. to 480° F.; and liquid hourly space velocity from 0.5 hr$^{-1}$ to 1.5 hr$^{-1}$.

Example 2

The properties of Feed B are also shown in Table 3. Feed B was processed through the first stage hydrotreating unit, which boosts viscosity index (VI) and removes sulfur and nitrogen. The hydrotreated feed was followed by a stripping section where light ends and diesel were removed. Both catalysts A and B were loaded in the same reactor, with the feed contacting catalyst A first. During Stage 1 hydrotreating, Feed B was subjected to one conversion level and displayed the properties shown in Table 4. The heavier lube fraction from this intermediate then entered the second stage where hydrocracking, dewaxing, and hydrofinishing were performed. Various processing conditions for each of these steps, shown in Table 4, were used to produce six Group III base stocks, B1-B6, which are shown in Tables 6-8. This combination of feed and process has been found to produce a base stock with unique compositional characteristics. As shown in FIGS. 4 and 6, these unique compositional characteristics were observed in both the lower and higher viscosity base stocks produced from Feed B.

Processing conditions for each of the steps described above—hydrotreating, hydrocracking, catalytic dewaxing, and hydrofinishing—were tuned based on the desired conversion and VI of the final base stock products. The conditions used to manufacture the Group III base stocks that are the subject of this disclosure can be found in Table 5. The extent of 700° F.+ conversion in the first hydrotreating stage ranged from 20 to 40%, and processing conditions in the first stage included a temperature from 635° F. to 725° F.; hydrogen partial pressure from 500 psig to 3000 psig; liquid hourly space velocity from 0.5 hr$^{-1}$ to 1.5 hr$^{-1}$, preferably from 0.5 hr$^{-1}$ to 1.0 hr$^{-1}$, most preferably from 0.7 hr$^{-1}$ to 0.9 hr$^{-1}$; and a hydrogen circulation rate from 3500 scf/bbl to 6000 scf/bbl.

The second stage, which consisted of hydrocracking, catalytic dewaxing, and hydrofinishing, was carried out in a single reactor with a hydrogen partial pressure of 300 psig to 5000 psig; a hydrogen circulation rate from 1000 scf/bbl to 6000 scf/bbl Catalysts C, D, and E were loaded into the same reactor in the second stage and the feed contacted them in the order C, D, E. Process parameters were tuned to achieve a desired 700° F.+ conversion of 15-70%, preferably 15-55%.

Processing conditions in the hydrocracking step included a temperature from 250° F. to 700° F.; and a liquid hourly space velocity from 0.5 hr$^{-1}$ to 1.5 hr$^{-1}$.

Processing conditions in the catalytic dewaxing step included a temperature from 250° F. to 660° F.; and liquid hourly space velocity from 1.0 hr$^{-1}$ to 3.0 hr$^{-1}$. Processing conditions in the hydrotreating step included a temperature from 250° F. to 480° F.; and liquid hourly space velocity from 0.5 hr$^{-1}$ to 1.5 hr$^{-1}$.

TABLE 5

|  | | Stage 1 | | | |
| --- | --- | --- | --- | --- | --- |
| Description | Feed Stage 1 Feed VI | Cats A & B 700 F. + Con. (wt. %) | Cats A & B T (° F.) | Cats A & B LHSV (hr$^{-1}$) | Feed Stage 2 Feed VI |
| LIGHT NEUTRALS | | | | | |
| A1 | 66.6 | 20.9 | 684 | 0.8 | 97.9 |
| A2 | 66.6 | 38.9 | 717 | 0.8 | 110.7 |
| A3 | 66.6 | 38.9 | 717 | 0.8 | 110.7 |
| B1 | 91.6 | 30.3 | 725 | 0.8 | 123.5 |
| B2 | 91.6 | 30.3 | 725 | 0.8 | 123.5 |

TABLE 5-continued

MEDIUM NEUTRALS

| | | | | | |
|---|---|---|---|---|---|
| A4 | 66.6 | 20.9 | 684 | 0.8 | 97.9 |
| A5 | 66.6 | 38.9 | 717 | 0.8 | 110.7 |
| B3 | 91.6 | 30.3 | 725 | 0.8 | 123.5 |
| B4 | 91.6 | 30.3 | 725 | 0.8 | 123.5 |

HEAVY NEUTRALS

| | | | | | |
|---|---|---|---|---|---|
| A6 | 66.6 | 38.9 | 717 | 0.8 | 110.7 |
| B5 | 91.6 | 30.3 | 725 | 0.8 | 123.5 |
| B6 | 91.6 | 30.3 | 725 | 0.8 | 123.5 |

Stage 2

| Description | 700 F.+ Con. (wt. %) | Cat C T (° F.) | Cat C LHSV (hr$^{-1}$) | Cat D T (° F.) | Cat D LHSV (hr$^{-1}$) | Cat E T (° F.) | Cat E LHSV (hr$^{-1}$) |
|---|---|---|---|---|---|---|---|
| LIGHT NEUTRALS | | | | | | | |
| A1 | 66.9 | 645 | 1.3 | 620 | 2.0 | 480 | 1.2 |
| A2 | 58.1 | 624 | 1.3 | 626 | 2.0 | 480 | 1.2 |
| A3 | 52.1 | 624 | 1.3 | 615 | 2.0 | 480 | 1.2 |
| B1 | 49.7 | 610 | 1.3 | 609 | 2.0 | 480 | 1.2 |
| B2 | 17.6 | 250 | 1.3 | 620 | 2.0 | 480 | 1.2 |
| MEDIUM NEUTRALS | | | | | | | |
| A4 | 66.9 | 645 | 1.3 | 620 | 2.0 | 480 | 1.2 |
| A5 | 58.1 | 624 | 1.3 | 626 | 2.0 | 480 | 1.2 |
| B3 | 49.7 | 610 | 1.3 | 609 | 2.0 | 480 | 1.2 |
| B4 | 17.6 | 250 | 1.3 | 620 | 2.0 | 480 | 1.2 |
| HEAVY NEUTRALS | | | | | | | |
| A6 | 58.1 | 624 | 1.3 | 626 | 2.0 | 480 | 1.2 |
| B5 | 49.7 | 610 | 1.3 | 609 | 2.0 | 480 | 1.2 |
| B6 | 17.6 | 250 | 1.3 | 620 | 2.0 | 480 | 1.2 |

| Description | Yield LN Yield (%) | Yield MN Yield (%) | Yield HN Yield (%) | Yield Total Lube Yield (%) |
|---|---|---|---|---|
| LIGHT NEUTRALS | | | | |
| A1 | 7.3 | 4.3 | 2.7 | 14.3 |
| A2 | 6.5 | 4.6 | 2.0 | 13.1 |
| A3 | 10.5 | 2.8 | 2.6 | 15.9 |
| B1 | 14.6 | 3.0 | 3.7 | 21.2 |
| B2 | 20.6 | 7.4 | 7.7 | 35.7 |
| MEDIUM NEUTRALS | | | | |
| A4 | 7.3 | 4.3 | 2.7 | 14.3 |
| A5 | 6.5 | 4.6 | 2.0 | 13.1 |
| B3 | 14.6 | 3.0 | 3.7 | 21.2 |
| B4 | 20.6 | 7.4 | 7.7 | 35.7 |
| HEAVY NEUTRALS | | | | |
| A6 | 6.5 | 4.6 | 2.0 | 13.1 |
| B5 | 14.6 | 3.0 | 3.7 | 21.2 |
| B6 | 20.6 | 7.4 | 7.7 | 21.2 |

Example 3 (Comparative)

A high quality vacuum gas oil feedstock was processed according to the conventional base stock hydroprocessing scheme shown by FIG. 1. This conventional hydroprocessing scheme used widely commercially available catalysts, and is meant to be representative of conventionally hydroprocessed Group III base stocks. Base stocks produced by this method are noted in the tables and figures as K1 and K2. Additionally, the properties of several commercially available base stocks can be found in the tables and figures below and are labeled as Commercial Comparative examples. The Commercial Comparative base stocks are all widely commercially available and are representative of the range of Group III products offered on the market today. Taken together, these commercial base stocks and base stocks K1 and K2 are used to illustrate the uniqueness of the inventive base stocks that are the subject of this disclosure.

Measurement Procedures

The lubricating oil base stock composition was determined using a combination of advanced analytical techniques including gas chromatography mass spectrometry (GCMS), supercritical fluid chromatography (SFC), and carbon-13 nuclear magnetic resonance ($^{13}$C NMR).

Viscosity index (VI) was determined according to ASTM method D2270. VI is related to kinematic viscosities measured at 40° C. and 100° C. using ASTM Method D445. Note that these will be abbreviated as KV100 and KV40. Pour point was measured by ASTM D5950.

Noack volatility was estimated using the results from gas chromatograph distillation (GCD) and previously established correlations between key boiling points and measured Noack using ASTM D5800. This correlation has been found to predict the measured result within the reproducibility of ASTM D5800. Similarly, the cold cranking simulator (CCS) at −35° C. was estimated using the Walther equation. Inputs into the equation were the experimentally measured kinematic viscosities at at 40° C. and 100° C. (ASTM D445), as well as density at 15.6° C. (ASTM D4052). On average, these estimated CCS at −35° C. results match the measured results of other base stocks within reproducibility of ASTM D5293. All results for Noack and CCS shown in Tables 6-8 were estimated using the above methods, so they can be compared against each other.

The unique compositional character of the lube base stocks of the instant disclosure may be determined by the amount and distribution of naphthenes, as determined by GCMS, as shown in FIGS. 3-6. Preferably, the GCMS results are corrected by SFC; however, it was found that the 2R+N/1RN ratios are identical regardless of whether or not the GCMS results were corrected by SFC.

SFC was conducted on a commercial supercritical fluid chromatograph system. The system was equipped with the following components: a high pressure pump for delivery of the supercritical carbon dioxide mobile phase; temperature controlled column oven; auto-sampler with high pressure liquid injection valve for delivery of sample material into mobile phase; flame ionization detector; mobile phase splitter (low dead volume tee); back pressure regulator to keep the CO$_2$ in a supercritical phase; and a computer and data system for control of components and recording of data signal.

For analysis, ~75 mg of sample was diluted in 2 mL of toluene and loaded into standard septum cap autosampler vials. The sample was introduced via a high pressure sampling valve. SFC separation was performed using multiple commercial silica packed columns (5 μm with either 60 or 30 Å pores) connected in series (250 mm in length and either 2 mm or 4 mm inner diameter). Column temperature was typically held at 35 or 40° C. For analysis, the column head pressure was typically 250 bar. Liquid CO$_2$ flow rates were typically 0.3 mL/minute for 2 mm inner diameter (i.d.) columns or 2.0 mL/minute for 4 mm i.d. columns. The samples run were mostly all saturate compounds that eluted before the solvent (here, toluene). The SFC FID signal was integrated into paraffin and naphthenic regions. A chromatograph was used to analyze lube base stocks for splits of total paraffins and total naphthenes. The paraffin/naphthene ratio was calibrated using a variety of standard materials.

SFC was conducted on a commercial supercritical fluid chromatograph system. The system was equipped with the following components: a high pressure pump for delivery of the supercritical carbon dioxide mobile phase; temperature controlled column oven; auto-sampler with high pressure liquid injection valve for delivery of sample material into mobile phase; flame ionization detector; mobile phase splitter (low dead volume tee); back pressure regulator to keep the $CO_2$ in a supercritical phase; and a computer and data system for control of components and recording of data signal. For analysis, ~75 mg of sample was diluted in 2 mL of toluene and loaded into standard septum cap autosampler vials. The sample was introduced via a high pressure sampling valve. SFC separation was performed using multiple commercial silica packed columns (5 μm with either 60 or 30 Å pores) connected in series (250 mm in length and either 2 mm or 4 mm inner diameter). Column temperature was typically held at 35 or 40° C. For analysis, the column head pressure was typically 250 bar. Liquid $CO_2$ flow rates were typically 0.3 mL/minute for 2 mm inner diameter (i.d.) columns or 2.0 mL/minute for 4 mm i.d. columns. The samples run were mostly all saturate compounds that eluted before the solvent (here, toluene). The SFC FID signal was integrated into paraffin and naphthenic regions. A chromatograph was used to analyze lube base stocks for splits of total paraffins and total naphthenes. The paraffin/naphthene ratio was calibrated using a variety of standard materials.

For GCMS used herein, approximately 50 milligram of a base stock sample was added to a standard 2 milliliter auto-sampler vial and diluted with methylene chloride solvent to fill the vial. Vials were sealed with septum caps. Samples were run using an Agilent 5975C GCMS (Gas Chromatography Mass Spectrometer) equipped with an auto-sampler. A non-polar GC column was used to simulate distillation or carbon number elution characteristics off the GC. The GC column used was a Restek Rxi-1 ms. The column dimensions were 30 meters in length×0.32 mm internal diameter with a 0.25 micron film thickness for the stationary phase coating. The GC column was connected to the split/split-less injection port (held at 360° C. and operated in split-less mode) of the GC. Helium in constant pressure mode (~7 PSI) was used for GC carrier phase. The outlet of the GC column was run into mass spectrometer via a transfer line held at a 350° C. The temperature program for the GC column is a follows: 2 minute hold at 100° C., program at 5° C. per minute, 30 minute hold at 350° C. The mass spectrometer was operated using an electron impact ionization source (held at 250° C.) and operated using standard conditions (70 eV ionization). Instrumental control and mass spectral data acquisition were obtained using the Agilent Chemstation software. Mass calibration and instrument tuning performance validated using vendor supplied standard based on instrument auto tune feature.

GCMS retention times for samples were determined relative to a normal paraffin retention based on analysis of standard sample containing known normal paraffins. Then the mass spectrum was averaged.

Samples were prepared for $^{13}C$ NMR by dissolving 25-30 wt % sample in $CDCl_3$ with 7% Cr(III)-acetylacetonate added as a relaxation agent. NMR experiments were performed on a JEOL ECS NMR spectrometer for which the proton resonance frequency was 400 MHz. Quantitative $^{13}C$ NMR experiments were performed at 27° C. using an inverse gated decoupling experiment with a 45° flip angle, 6.6 seconds between pulses, 64 k data points and 2400 scans. All spectra were referenced to trimethylsiloxane (TMS) at 0 ppm. Spectra were processed with 0.2-1 Hz of line broadening and a baseline correction was applied prior to manual integration. The entire spectrum was integrated to determine the mole % of the different integrated areas as follows: 32.19-31.90 ppm gamma carbons; 30.05-29.65 ppm epsilon carbons; 29.65-29.17 ppm delta carbons; 22.96-22.76 ppm beta carbons; 22.76-22.50 ppm pendant and terminal methyl groups; 19.87-18.89 ppm pendant methyl groups; 14.73-14.53 ppm pendant propyl groups; 14.53-14.35 ppm terminal propyl groups; 14.35-13.80 ppm alpha carbons; 11.67-11.22 ppm terminal ethyl groups; and 11.19-10.57 ppm pendant ethyl groups.

For the analysis herein, straight-chain carbons are defined as the sum of the alpha, beta, gamma, delta, and epsilon peaks. Branched carbons are defined as the sum of pendant methyl, pendant ethyl, and pendant propyl groups. Terminal carbons are defined as the sum of the terminal methyl, terminal ethyl, and terminal propyl groups.

Examples of Group III low viscosity lubricating oil base stocks of this disclosure and having a KV100 in the range of 4-5 cSt are shown in Table 6. For reference, the low viscosity lubricating oil base stocks of this disclosure are compared with typical Group III low viscosity base stocks having the same viscosity range. The Group III base stocks with unique compositions produced by the process of the present disclosure exhibit a range of base stock KV100 from 4 cSt to 5 cSt. The differences in composition include a difference in the ratio of multi-ring naphthenes to single ring naphthenes (2R+N/1RN), that is, the ratio for the compositions of the present disclosure is less than about 0.46, as shown in Table 6, as well as FIGS. 4 and 6.

The co-processed medium and high viscosity product from the above described process also showed the unique compositional characteristics described herein. Examples of such Group III medium viscosity lubricating oil base stocks having KV100 in the range of 5-11 cSt are shown in Tables 7 and 8. For reference, the medium viscosity lubricating oil base stocks of this disclosure are compared with typical Group III high viscosity base stocks having the same viscosity range.

TABLE 6

Properties of Light Neutral Base Stocks

| Sample | Feedstock | KV100, cSt | KV40, cSt | VI | Pour Pt., ° C. |
|---|---|---|---|---|---|
| LIGHT NEUTRALS | | | | | |
| Commercial Comparative Ex. A | Slack Wax | 4.073 | 17.23 | 140 | −19 |
| Commercial Comparative Ex. B | Waxy VGO | 4.208 | 18.57 | 135 | −18 |
| Commercial Comparative Ex. C | VGO | 4.263 | 19.49 | 127 | −16 |
| Commercial Comparative Ex. D | VGO | 4.220 | 19.47 | 122 | −15 |
| A1 | Raffinate/ VGO Blend | 4.240 | 19.79 | 120 | −24 |
| A2 | Raffinate/ VGO Blend | 4.210 | 19.00 | 128 | −20 |

TABLE 6-continued

Properties of Light Neutral Base Stocks

| Sample | Feedstock | KV100 | KV40 | VI | Pour Pt., °C |
|---|---|---|---|---|---|
| A3 | Raffinate/VGO Blend | 4.173 | 18.48 | 132 | −8 |
| B1 | VGO | 4.144 | 18.07 | 132 | −18 |
| B2 | VGO | 4.290 | 19.89 | 124 | −19 |
| K1 Comparative | VGO | 4.173 | 19.25 | 121 | −26 |
| K2 Comparative | VGO | 4.934 | 23.68 | 137 | −17 |
| Commercial Comparative Ex. E | Extracted VGO | 4.624 | 23.45 | 114 | −19 |
| Commercial Comparative Ex. F | Extracted VGO | 4.624 | 23.45 | 114 | −19 |

| Sample | Est. CCS at −35° C., cP | Est. Noack, wt % | 1RN, wt % | 2R + N, wt % | 2R + N/1RN |
|---|---|---|---|---|---|
| LIGHT NEUTRALS | | | | | |
| Commercial Comparative Ex. A | 1610 | 13.1 | 19.87 | 6.31 | 0.32 |
| Commercial Comparative Ex. B | 2020 | 12.4 | 23.29 | 9.61 | 0.41 |
| Commercial Comparative Ex. C | 2640 | 13.7 | 36.87 | 19.83 | 0.54 |
| Commercial Comparative Ex. D | 2880 | 16.0 | 41.04 | 21.56 | 0.53 |
| A1 | 3040 | 14.3 | 34.29 | 15.82 | 0.46 |
| A2 | 2420 | 13.0 | 26.88 | 10.92 | 0.41 |
| A3 | 2140 | 12.6 | 24.08 | 9.62 | 0.40 |
| B1 | 2050 | 14.1 | 29.46 | 9.35 | 0.32 |
| B2 | 2910 | 14.5 | 37.41 | 16.60 | 0.44 |
| K1 Comparative | 2830 | 18.1 | 35.17 | 18.75 | 0.53 |
| K2 Comparative | 3580 | 13.5 | 38.44 | 15.82 | 0.41 |
| Commercial Comparative Ex. E | 5290 | 14.1 | 43.24 | 25.56 | 0.59 |
| Commercial Comparative Ex. F | 5290 | 14.1 | 44.82 | 25.08 | 0.56 |

TABLE 7

Properties of Medium Neutral Base Stocks

| Sample | Feedstock | KV100, cSt | KV40, cSt | VI | Pour Pt., °C |
|---|---|---|---|---|---|
| MEDIUM NEUTRALS | | | | | |
| Commercial Comparative Ex. G | Slack Wax | 6.547 | 34.99 | 144 | −27 |
| Commercial Comparative Ex. H | VGO | 6.427 | 36.17 | 131 | −12 |
| Commercial Comparative Ex. I | VGO | 6.181 | 34.27 | 130 | −24 |
| A4 | Raffinate/VGO Blend | 5.760 | 31.67 | 125 | −20 |
| A5 | Raffinate/VGO Blend | 5.714 | 32.23 | 133 | −16 |
| B3 | VGO | 6.464 | 34.42 | 141 | −12 |
| B4 | VGO | 6.379 | 35.47 | 132 | −15 |
| Commercial Comparative Ex. J | Extracted VGO | 6.563 | 42.42 | 106 | −17 |

TABLE 7-continued

Properties of Medium Neutral Base Stocks

| Sample | Est. CCS at −35° C., cP | Est. Noack, wt % | 1RN, wt % | 2R + N, wt % | 2R + N/1RN |
|---|---|---|---|---|---|
| MEDIUM NEUTRALS | | | | | |
| Commercial Comparative Ex. G | 6910 | 7.1 | 36.80 | 15.90 | 0.43 |
| Commercial Comparative Ex. H | 9630 | 5.5 | 40.74 | 24.06 | 0.59 |
| Commercial Comparative Ex. I | 8970 | 5.2 | 39.39 | 22.82 | 0.58 |
| A4 | 8600 | 6.4 | 38.24 | 22.56 | 0.59 |
| A5 | 6650 | 5.3 | 29.44 | 12.36 | 0.42 |
| B3 | 7250 | 2.7 | 32.52 | 9.32 | 0.29 |
| B4 | 9120 | 3.6 | 41.00 | 17.01 | 0.41 |
| Commercial Comparative Ex. J | 24890 | 8.0 | 46.73 | 35.38 | 0.76 |

TABLE 8

Properties of Heavy Neutral Base Stocks

| Sample | Feedstock | KV100, cSt | KV40, cSt | VI | Pour Pt., °C |
|---|---|---|---|---|---|
| HEAVY NEUTRALS | | | | | |
| A6 | Raffinate/VGO Blend | 10.570 | 77.23 | 122 | −22 |
| B5 | VGO | 8.767 | 53.35 | 140 | −13 |
| B6 | VGO | 9.244 | 59.70 | 135 | −18 |

| Sample | Est. CCS at −35° C., cP | Est. Noack, wt % | 1RN, wt % | 2R + N, wt % | 2R + N/1RN |
|---|---|---|---|---|---|
| HEAVY NEUTRALS | | | | | |
| A6 | 47430 | 0.9 | 43.56 | 20.55 | 0.57 |
| B5 | 16260 | 1.0 | 56.88 | 11.52 | 0.36 |
| B6 | 22220 | 0.9 | 45.73 | 15.58 | 0.40 |

PCT and EP Clauses

1. A Group III base stock comprising: at least about 30 wt % of naphthenes; a viscosity index of from 120 up to 133; and a ratio of molecules with multi-ring naphthenes to single ring naphthenes, 2R+N/1RN, of less than 0.46.

2. The base stock of clause 1, wherein an amount of saturated hydrocarbons is 95 wt. % or higher.

3. The base stock of clauses 1 or 2, wherein the Group III base stock comprises a KV100 of from 2 cSt to 14 cSt.

4. The base stock of any of clauses 1-3, wherein the KV100 is from 4.0 cSt to 5.0 cSt.

5. The base stock of clauses 1 or 2, wherein the KV100 is from 5.0 cSt to 12.0 cSt.

6. The base stock of clauses 1, 2 or 5, wherein the KV100 is from 5.5 cSt to 11.0 cSt.

7. The base stock of any of clauses 1-4, wherein the viscosity index is from 120-140 and is less than or equal to $142*(1-0.0025 \exp(8*(2R+N/1RN)))$.

8. The base stock of any of clauses 1, 2, 5, or 6, wherein the viscosity index is from 120-145 and is less than or equal to $150.07*(1-0.0106*\exp(4.5*(2R+N/1RN)))$.

9. A lubricating composition comprising the base stock of any of clauses 1-8 and an additive.

10. The lubricating composition of clause 9, wherein the base stock has a viscosity index that is from 120-140 and is less than or equal to $142*(1-0.0025 \exp(8*(2R+N/1RN)))$.

11. The lubricating composition of clause 10, wherein the base stock has a viscosity index that is from 120-145 and is less than or equal to $150.07*(1-0.0106*\exp(4.5*(2R+N/1RN)))$.

12. A method for producing a diesel fuel and a base stock, comprising: providing a feed stock comprising a vacuum gas oil; hydrotreating the feed stock under first effective hydrotreating conditions to produce a first hydrotreated effluent; hydrotreating the first hydrotreated effluent under second effective hydrotreating conditions to produce a second hydrotreated effluent; fractionating the second hydrotreated effluent to produce at least a first diesel product fraction and a bottoms fraction; hydrocracking the bottoms fraction under effective hydrocracking conditions to produce a hydrocracked effluent; dewaxing the hydrocracked effluent under effective catalytic dewaxing conditions to produce a dewaxed effluent, the dewaxing catalyst including at least one non-dealuminated, unidimensional, 10-member ring pore zeolite, and at least one Group VI metal, Group VIII metal or combination thereof; hydrotreating the dewaxed effluent under third effective hydrotreating conditions to produce a third hydrotreated effluent; and fractionating the third hydrotreated effluent to form at least a second diesel product fraction and a base stock product fraction, wherein the Group III lubricant base stock product fraction includes greater than or equal to 90 wt. % saturates, less than 10 wt. % aromatics, a kinematic viscosity at 100° C. between about 4 and about 6 cSt and has a ratio of molecules with multi-ring naphthenes to single ring naphthenes (2R+N/1RN) of less than about 0.46.

13. The method of clause 12, wherein the feedstock has a solvent dewaxed oil feed viscosity index of from about 60 to about 150.

14. The method of clause 12, wherein the effective hydrotreating conditions include a temperature of from 300° C. to 450° C., hydrogen partial pressure of from 1500 psi to 5000 psi (~10.3 MPa to ~34.6 MPa), a liquid hourly space velocity of from 0.2 to 10 hr$^{-1}$, and a hydrogen circulation rate of from 35.6 to 1781 m$^3$/m$^3$ (200 scf/B to 10,000 scf/B).

15. The method of clause 12, wherein the effective hydrocracking conditions include a temperature of 288° C. to 450° C., a hydrogen partial pressure of 1000 psig to 5000 psig (~6.9 MPa to 34.6 MPa), a liquid hourly space velocity of 0.05 hr$^{-1}$ to 10 hr$^{-1}$, and a hydrogen treat gas rate of from 35.6 m$^3$/m$^3$ to 1781 m$^3$/m$^3$ (200 scf/bbl to 10,000 scf/bbl).

16. The method of clause 12, wherein the dewaxing catalyst comprises a molecular sieve having a SiO$_2$:Al$_2$O$_3$ ratio of 200:1 to 30:1 and comprises from 0.1 wt. % to 3.33 wt. % framework Al$_2$O$_3$ content, the dewaxing catalyst including from 0.1 wt. % to 5 wt. % platinum.

17. The method of clause 16, wherein the molecular sieve is EU-1, ZSM-35, ZSM-11, ZSM-57, NU-87, ZSM-22, EU-2, EU-11, ZBM-30, ZSM-48, ZSM-23, or a combination thereof.

18. The method of clause 17, wherein the molecular sieve is ZSM-48, ZSM-23, or a combination thereof.

19. The method of clause 13, wherein the dewaxing catalyst comprises at least one low surface area metal oxide, refractory binder, the binder being silica, alumina, titania, zirconia, or silica-alumina.

20. The method of clause 19, wherein the metal oxide, refractory binder further comprises a second metal oxide, refractory binder different from the first metal oxide, refractory binder.

21. The method of clause 20, wherein the dewaxing catalyst comprises a micropore surface area to total surface area ratio of greater than or equal to 25%, wherein the total surface area equals the surface area of the external zeolite plus the surface area of the binder, the surface area of the binder being 100 m$^2$/g or less.

22. The method of clause 21, wherein the hydrocracking catalyst is a zeolite Y based catalyst.

23. The method of clause 22, wherein the effective dewaxing conditions include a temperature of from 200° C. to 450° C., a hydrogen partial pressure of from 250 to 5000 psi (1.8 MPa to 34.6 MPa), a liquid hourly space velocity of from 0.2 to 10 hr$^{-1}$, and a hydrogen circulation rate of from 35.6 m$^3$/m$^3$ to 1781 m$^3$/m$^3$ (200 scf/bbl to 10,000 scf/bbl).

24. The method of clause 13, wherein the total conversion of the hydrocracked, dewaxed bottoms relative to the feedstock is 30% to 90%.

25. The method of clause 13, wherein the feed stock is a solvent dewaxed oil.

26. A Group III base stock comprising: at least about 30 wt % of naphthenes; a viscosity index of from 120 up to 145 that is less than or equal to $142*(1-0.0025 \exp(8*(2R+N/1RN)))$.

27. The base stock of clause 26, wherein the pour point is from −10° C. to −30° C., the Noack volatility is from 0.5 wt. % to 20 wt. % and has a CCS value at −35° C. of from 100 cP up to 70,000 cP.

28. A Group III base stock comprising: at least about 30 wt % of naphthenes; a viscosity index of from 120 up to 145 that is less than or equal to $150.07*(1-0.0106*\exp(4.5*(2R+N/1RN)))$.

29. The base stock of clause 28, wherein the pour point is from −10° C. to −30° C., the Noack volatility is from 0.5 wt. % to 20 wt. % and has a CCS value at −35° C. of from 100 cP up to 70,000 cP.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

The invention claimed is:

1. A Group III base stock comprising:
   at least about 30 wt % of naphthenes;
   about 30 wt % to about 70 wt % paraffins;
   wherein the Group III base stock has a viscosity index of about 120 to about 133;
   wherein the Group III base stock has a kinematic viscosity at 40° C. (KV40) of about 18.07 cSt to about 19.89 cSt; and
   wherein the Group III base stock has a ratio of molecules with multi-ring naphthenes to single ring naphthenes, 2R+N/1RN, of less than about 0.46.

2. The base stock of claim 1, wherein the base stock has an amount of saturated hydrocarbons of at least 95 wt %.

3. The base stock of claim 1, wherein the base stock has a kinematic viscosity at 100° C. (KV100) of about 4.0 cSt to about 5.0 cSt.

4. The base stock of claim 1, wherein the base stock has a kinematic viscosity at 100° C. (KV100) of about 5.0 cSt to about 12.0 cSt.

5. The base stock of claim 4, wherein the base stock has a viscosity index of about 20 to about 133.

6. A lubricating composition comprising the base stock of claim 1 and an additive.

7. The lubricating composition of claim 6, wherein the base stock has a viscosity index of about 120 to about 133.

8. A method for producing a diesel fuel and a base stock, comprising:
   providing a feed stock comprising a vacuum gas oil;
   hydrotreating the feed stock under first effective hydrotreating conditions to produce a first hydrotreated effluent;
   hydrotreating the first hydrotreated effluent under second effective hydrotreating conditions to produce a second hydrotreated effluent;
   fractionating the second hydrotreated effluent to produce at least a first diesel product fraction and a bottoms fraction;
   hydrocracking the bottoms fraction under effective hydrocracking conditions to produce a hydrocracked effluent;
   dewaxing the hydrocracked effluent under effective catalytic dewaxing conditions to produce a dewaxed effluent, the dewaxing catalyst including at least one non-dealuminated, unidimensional, 10-member ring pore zeolite, and at least one Group 6 metal, Group 8 metal or combination thereof;
   hydrotreating the dewaxed effluent under third effective hydrotreating conditions to produce a third hydrotreated effluent; and
   fractionating the third hydrotreated effluent to form at least a second diesel product fraction and the base stock of claim 1.

9. The method of claim 8, wherein the feedstock has a solvent dewaxed oil feed viscosity index of about 45 to about 150.

10. The method of claim 8, wherein the effective hydrotreating conditions include a temperature of about 300° C. to about 450° C., hydrogen partial pressure of about 1500 psi to about 5000 psi (~10.3 MPa to ~34.6 MPa), a liquid hourly space velocity of about 0.2 to about 10 hr$^{-1}$, and a hydrogen circulation rate of about 35.6 to about 1781 m$^3$/m$^3$ (about 200 scf/bbl to about 10,000 scf/bbl).

11. The method of claim 8, wherein the effective hydrocracking conditions include a temperature of about 288° C. to about 450° C., a hydrogen partial pressure of about 1000 psig to about 5000 psig about 6.9 MPa to about 34.6 MPa), a liquid hourly space velocity of about 0.05 h$^{-1}$ to about 10 h$^{-1}$, and a hydrogen treat gas rate of about 35.6 m$^3$/m$^3$ to about 1781 m$^3$/m$^3$ (about 200 scf/bbl to about 10,000 scf/bbl).

12. The method of claim 8, wherein the dewaxing catalyst comprises a molecular sieve having a SiO$_2$:Al$_2$O$_3$ ratio of about 200:1 to about 30:1 and comprises about 0.1 wt. % to about 3.33 wt. % framework Al$_2$O$_3$ content, the dewaxing catalyst including about 0.1 wt. % to about 5 wt. % platinum.

13. The method of claim 12, wherein the molecular sieve is EU-1, ZSM-35, ZSM-11, ZSM-57, NU-87, ZSM-22, EU-2, EU-11, ZBM-30, ZSM-48, ZSM-23, or a combination thereof.

14. The method of claim 13, wherein the molecular sieve is ZSM-48, ZSM-23, or a combination thereof.

15. The method of claim 9, wherein the dewaxing catalyst comprises at least one metal oxide, refractory binder, the binder being silica, alumina, titania, zirconia, or silica-alumina.

16. The method of claim 15, wherein the metal oxide, refractory binder further comprises a second metal oxide, refractory binder different from the first metal oxide, refractory binder.

17. The method of claim 16, wherein the dewaxing catalyst comprises a micropore surface area to total surface area ratio of greater than or equal to about 25%, wherein the total surface area equals the surface area of the external zeolite plus the surface area of the binder, the surface area of the binder being about 100 m$^2$/g or less.

18. The method of claim 17, wherein the hydrocracking catalyst is a zeolite Y based catalyst.

19. The method of claim 18, wherein the effective dewaxing conditions include a temperature of about 200° C. to about 450° C., a hydrogen partial pressure of about 250 to about 5000 psi (about 1.8 MPa to 34.6 about MPa), a liquid hourly space velocity of about 0.2 to about 10 hr$^{-1}$, and a hydrogen circulation rate of about 35.6 m$^3$/m$^3$ to about 1781 m$^3$/m$^3$ (about 200 scf/bbl to about 10,000 scf/bbl).

20. The method of claim 8, wherein the total conversion of the hydrocracked, dewaxed bottoms relative to the feedstock is about 30% to about 90%.

21. The method of claim 8, wherein the feed stock is a solvent dewaxed oil.

22. A Group III base stock comprising:
   at least about 30 wt % of naphthenes;
   about 30 wt % to about 70 wt % paraffins;
   wherein the Group III base stock has:
      a viscosity index of 120 to 145;
      a kinematic viscosity at 40° C. (KV40) of about 18.07 cSt to about 19.89 cSt; and,
      a ratio of molecules with multi-ring naphthenes to single ring naphthenes, 2R+N/1RN, of less than about 0.46.

23. The base stock of claim 22, wherein the base stock has a pour point of about −10° C. to about −30° C., a Noack volatility of about 0.5 wt. % to about 20 wt. %, and a cold crank simulator (CCS) value at −35° C. of about 100 cP up to about 70,000 cP.

24. A Group III base stock comprising:
   at least about 30 wt % of naphthenes; and
   about 30 wt % to about 70 wt % paraffins;
   wherein the Group III base stock has:
      a viscosity index of about 120 to about 145;
      a ratio of molecules with multi-ring naphthenes to single ring naphthenes, 2R+N/1RN, of less than about 0.46;

a kinematic viscosity at 100° C. (KV100) of about 8 cSt to about 12 cSt;

a kinematic viscosity at 40° C. (KV40) of about 53.35 cSt to about 59.7 cSt; and a cold crank simulator (CCS) value at −35° C. of about 10,000 cP to about 70,000 cP.

25. The base stock of claim 24, wherein the base stock has a pour point of about −10° C. to about −30° C., and a Noack volatility is about 0.5 wt. % to about 20 wt. %.

26. The base stock of claim 1, wherein the base stock has a KV40 of about 18.07 cSt to about 19 cSt.

27. The base stock of claim 1, wherein the base stock has a KV40 of about 19 cSt to about 19.89 cSt.

28. The base stovk of claim 24, wherein the base stock has a weight ratio of molecules with multi-ring naphthenes to single ring naphthenes, 2R+N/1RN, of about 0.36 about 0.4.

* * * * *